United States Patent
Shimazu et al.

(10) Patent No.: US 12,240,409 B2
(45) Date of Patent: Mar. 4, 2025

(54) VEHICLE OCCUPANT RESTRAINT DEVICE

(71) Applicant: TOYOTA JIDOSHA KABUSHIKI KAISHA, Toyota (JP)

(72) Inventors: Katsuya Shimazu, Toyota (JP); Mitsuyoshi Ohno, Miyoshi (JP); Kaname Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/586,758

(22) Filed: Feb. 26, 2024

(65) Prior Publication Data
US 2024/0300438 A1    Sep. 12, 2024

(30) Foreign Application Priority Data
Mar. 10, 2023  (JP) .................... 2023-038149

(51) Int. Cl.
*B60R 21/2338* (2011.01)
*B60R 21/231* (2011.01)
*B60R 21/239* (2006.01)

(52) U.S. Cl.
CPC .... *B60R 21/2338* (2013.01); *B60R 21/23138* (2013.01); *B60R 21/239* (2013.01)

(58) Field of Classification Search
CPC ........ B60R 21/231; B60R 2021/23107; B60R 21/23138; B60R 21/239; B60R 2021/2395; B60R 21/18; B60R 21/2338
USPC ...................................................... 280/733
See application file for complete search history.

(56) References Cited

U.S. PATENT DOCUMENTS

| | | | | |
|---|---|---|---|---|
| 3,971,569 A | * | 7/1976 | Abe | B60R 21/18 180/274 |
| 5,871,230 A | * | 2/1999 | Lewis | B60R 22/14 280/743.1 |
| 7,513,524 B2 | * | 4/2009 | Oota | B60R 21/18 280/733 |
| 7,980,590 B2 | * | 7/2011 | Foubert | B60R 21/18 280/801.1 |
| 9,925,950 B2 | * | 3/2018 | Moeller | B60R 21/239 |
| 9,944,245 B2 | * | 4/2018 | Moeller | B60R 21/18 |
| 11,524,654 B2 | * | 12/2022 | Kanegae | B60R 21/0134 |
| 2005/0230945 A1 | * | 10/2005 | Watanabe | B60R 21/231 280/733 |
| 2006/0119085 A1 | | 6/2006 | Masuda et al. | |
| 2009/0278339 A1 | | 11/2009 | Azuma et al. | |
| 2009/0278340 A1 | | 11/2009 | Azuma et al. | |

(Continued)

FOREIGN PATENT DOCUMENTS

| | | |
|---|---|---|
| JP | 2005-297917 A | 10/2005 |
| JP | 2006-160062 A | 6/2006 |

(Continued)

*Primary Examiner* — Paul N Dickson
*Assistant Examiner* — Caitlin Anne Miller
(74) *Attorney, Agent, or Firm* — Finnegan, Henderson, Farabow, Garrett and Dunner, LLP

(57) ABSTRACT

A vehicle occupant restraint device includes: a seatbelt configured to restrain an occupant on a vehicle seat, the occupant sitting in the vehicle seat; and an upper-body restraint air-bag configured to perform expanding spread between a shoulder belt of the seatbelt and a chest region of the occupant and to restrain at least the chest region of the occupant, by receiving supply of gas from an inflator, at a time of frontal collision of a vehicle.

17 Claims, 14 Drawing Sheets

(56) References Cited

U.S. PATENT DOCUMENTS

2015/0069741 A1 3/2015 Shimazu
2018/0281727 A1* 10/2018 Jenny .................... B60R 21/231

FOREIGN PATENT DOCUMENTS

| JP | 2009-269538 A | 11/2009 |
| JP | 2009-269539 A | 11/2009 |
| JP | 5239604 B2 | 7/2013 |
| JP | 2015-051744 A | 3/2015 |
| JP | 2015-217740 A | 12/2015 |

* cited by examiner

VEHICLE OCCUPANT RESTRAINT DEVICE

CROSS-REFERENCE TO RELATED APPLICATION

This application claims priority to Japanese Patent Application No. 2023-038149 filed on Mar. 10, 2023, incorporated herein by reference in its entirety.

BACKGROUND

1. Technical Field

The present disclosure relates to a vehicle occupant restraint device.

2. Description of Related Art

There is known a vehicle occupant restraint device that prevents the head of an occupant from coming into contact with a steering wheel by providing a head protection bag to expand to a vehicle forward side and to receive the head of the occupant at a belt expansion portion provided on a shoulder belt, and that allows the removal or downsizing of an air-bag that performs expanding spread from the steering wheel toward the front of the occupant (see Japanese Unexamined Patent Application Publication No. 2005-297917, for example).

In addition, there is known an occupant restraint device that is provided with an auxiliary air-bag device to expand and spread an auxiliary bag body to a vehicle forward side of the shoulder region of the occupant on an opposite shoulder belt side (vehicle width directional inner side) at the time of frontal collision of the vehicle, and the shoulder region of the occupant on the opposite shoulder belt side when the occupant sits in a seat is restrained on the seat through the auxiliary bag body. Thus, it is possible to stably restrain both vehicle width directional sides of the upper half body of the occupant by the occupant restraint device (see Japanese Unexamined Patent Application Publication No. 2015-217740, for example).

SUMMARY

However, in the above occupant restraint devices, a configuration in which the steering wheel or the air-bag that performs the expanding spread from the steering wheel toward the front of the occupant serves as a receiving surface for reaction force at the time of the frontal collision of the vehicle is assumed. Therefore, for example, during autonomous driving, when the occupant sitting in a seat such as a driver's seat, an assistant driver's seat, and a rear seat adopts such a seat position that the seat is significantly away from the steering wheel or the air-bag to perform the expanding spread toward the front of the occupant, to a vehicle rearward side, it is difficult to effectively restrain the occupant.

The present disclosure provides a vehicle occupant restraint device that makes it possible to effectively restrain the occupant at the time of the frontal collision of the vehicle, regardless the seat position.

A vehicle occupant restraint device according to a first aspect of the present disclosure includes: a seatbelt configured to restrain an occupant on a vehicle seat, the occupant sitting in the vehicle seat; and an upper-body restraint air-bag configured to perform expanding spread between a shoulder belt of the seatbelt and a chest region of the occupant and to restrain at least the chest region of the occupant, by receiving supply of gas from an inflator, at a time of frontal collision of a vehicle.

With the vehicle occupant restraint device according to the first aspect of the present disclosure, the upper-body restraint air-bag is configured to perform the expanding spread between the shoulder belt of the seatbelt and the chest region of the occupant and to restrain at least the chest region of the occupant, by receiving the supply of the gas from the inflator, at the time of the frontal collision of the vehicle. That is, the shoulder belt of the seatbelt serves as a receiving member for the reaction force of the upper-body restraint air-bag. Accordingly, for example, during autonomous driving, even when the occupant sitting in the vehicle seat such as a driver's seat, an assistant driver's seat, and a rear seat adopts such a seat position that the vehicle seat is significantly away from the steering wheel or the air-bag to perform the expanding spread toward the front of the occupant, to a vehicle rearward side, the occupant is effectively restrained. In this way, with the present disclosure, the occupant is effectively restrained at the time of the frontal collision of the vehicle, regardless of the seat position.

Further, since the upper-body restraint air-bag performs the expanding spread between the shoulder belt of the seatbelt and the chest region of the occupant, the concentrated load that is applied to the chest region of the occupant by the shoulder belt is distributed over a wider range on the chest region of the occupant. Therefore, the chest region injury value of an occupant that has a relatively low chest region tolerance, as exemplified by women and elderly persons, is reduced. Herein, "the time of the frontal collision" of the vehicle may include the time when it is expected (predicted) that it is impossible to avoid the frontal collision of the vehicle.

Further, in the vehicle occupant restraint device according to the first aspect of the present disclosure, the upper-body restraint air-bag may be attached to an occupant side of the shoulder belt while being folded. A shoulder belt anchorage of the seatbelt and the inflator may be provided at a seatback of the vehicle seat, and the upper-body restraint air-bag may be configured to receive the supply of the gas from the inflator through a gas supply duct that passes through a downward side of the shoulder belt anchorage.

In the vehicle occupant restraint device according to the first aspect of the present disclosure, the upper-body restraint air-bag may be attached to the occupant side of the shoulder belt while being folded, and the shoulder belt anchorage of the seatbelt and the inflator may be provided at the seatback of the vehicle seat. Moreover, the upper-body restraint air-bag may be configured to receive the supply of the gas from the inflator through the gas supply duct that passes through the vehicle downward side of the shoulder belt anchorage. That is, the constituent components may be provided at the vehicle seat. Accordingly, the occupant is effectively restrained at the time of the frontal collision of the vehicle, regardless of the seat position, and the vehicle occupant restraint device is easily equipped in the vehicle because the vehicle seat only needs to be mounted.

Further, in the vehicle occupant restraint device according to the first aspect of the present disclosure, in the upper-body restraint air-bag after completion of the expanding spread, an area of the upper-body restraint air-bag on an opposite shoulder belt side in front view may be set so as to be smaller than an area of the upper-body restraint air-bag on a shoulder belt side in the front view, the opposite shoulder belt side being opposite to the shoulder belt side, and the upper-body restraint air-bag may be configured such that the upper-body restraint air-bag on the shoulder belt side restrains the occupant from a shoulder region to an abdominal region and the upper-body restraint air-bag on the opposite shoulder belt side restrains the occupant from the shoulder region to the chest region.

In the vehicle occupant restraint device according to the first aspect of the present disclosure, in the upper-body restraint air-bag after completion of the expanding spread, the area of the upper-body restraint air-bag on the opposite shoulder belt side in the front view may be set so as to be smaller than the area of the upper-body restraint air-bag on the shoulder belt side in the front view, the opposite shoulder belt side being opposite to the shoulder belt side. By the upper-body restraint air-bag, the shoulder belt side may restrain the occupant from the shoulder region to the abdominal region, and the opposite shoulder belt side may restrain the occupant from the shoulder region to the chest region. That is, with the upper-body restraint air-bag, it is possible to generate a moderate restraining force to the shoulder region on the opposite shoulder belt side on which the shoulder belt is not put. Accordingly, the right and left shoulder regions of the occupant are efficiently restrained. Further, with the upper-body restraint air-bag, the input load that is applied to the chest region and abdominal region (including a lateral region of the abdomen) of the occupant by the shoulder belt is distributed and reduced.

In the vehicle occupant restraint device according to the first aspect of the present disclosure, the shape of the upper-body restraint air-bag after the completion of the expanding spread may be a triangular shape in the front view, and the upper-body restraint air-bag may include chambers at a plurality of stages in an interior, and may be configured such that the gas is sequentially supplied from a chamber at a highest stage to a chamber at a lowest stage in a middle of the expanding spread, each of the chambers extending along a seat width direction.

In the vehicle occupant restraint device according to the first aspect of the present disclosure, the shape of the upper-body restraint air-bag after the completion of the expanding spread may be a triangular shape in front view. Accordingly, a gap is formed between the shoulder belt and the abdominal region of the occupant, and the hard press to the abdominal region of the occupant due to the concentrated load that is applied by the shoulder belt is eased. Further, the upper-body restraint air-bag may include the chambers that extend along the seat width direction, at the plurality of stages in the interior, and may be configured such that the gas is sequentially supplied from the chamber at the highest stage to the chamber at the lowest stage in the middle of the expanding spread. That is, the chamber at the highest stage may perform the first expanding spread. Accordingly, the position of the shoulder belt is stabilized. Further, since the chamber at the highest stage may perform the first expanding spread, gaps that smooth the expanding spread of the chambers from the chamber at the highest stage to the chamber at the lowest stage are efficiently formed. Herein, the "triangular shape" may include a "roughly triangular shape" in which an acute-angled portion is not formed.

The vehicle occupant restraint device according to the first aspect of the present disclosure may further include a first check valve structure provided in the chamber at the highest stage. The first check valve structure may be configured to hold the internal pressure of the chamber at the highest stage, and the first check valve structure may include a cloth member configured to have slack so as not to close a vent hole in the middle of the expanding spread and configured to eliminate the slack so as to close the vent hole at a time of the completion of the expanding spread, the vent hole being a hole through which the gas from the inflator passes.

The vehicle occupant restraint device according to the first aspect of the present disclosure may include the first check valve structure provided in the chamber at the highest stage, and the first check valve structure may be configured to hold the internal pressure of the chamber at the highest stage, and may include the cloth member configured to have the slack so as not to close the vent hole through which the gas from the inflator passes, in the middle of the expanding spread, and configured to eliminate the slack so as to close the vent hole at the time of the completion of the expanding spread. Accordingly, the internal pressure of the upper-body restraint air-bag that overlaps with the shoulder belt is effectively held, and the upper-body restraint air-bag is curbed from being bent and deformed to an opposite occupant side (seat forward side) at the shoulder belt that is a base point (support point). Further, since the internal pressure of the upper-body restraint air-bag is effectively increased, the upper-body restraint air-bag is curbed from crushing due to the concentrated load by the shoulder belt.

In the vehicle occupant restraint device according to the first aspect of the present disclosure, a partition cloth that partitions an internal space of the chamber at the highest stage may be provided in the interior of the chamber at the highest stage, and the vent hole may be provided on the partition cloth.

Further, in the vehicle occupant restraint device according to the first aspect of the present disclosure, a shape of the upper-body restraint air-bag after the completion of the expanding spread may be a triangular shape in the front view, and the upper-body restraint air-bag may include a central chamber, a left chamber, and a right chamber in an interior, the central chamber extending along the shoulder belt and overlapping with the shoulder belt, each of the left chamber and the right chamber being configured to receive supply of gas from the central chamber.

In the vehicle occupant restraint device according to the first aspect of the present disclosure, the shape of the upper-body restraint air-bag after the completion of the expanding spread may be a triangular shape in the front view. Accordingly, a gap is formed between the shoulder belt and the abdominal region of the occupant, and the hard press to the abdominal region of the occupant due to the concentrated load that is applied by the shoulder belt is eased. Further, the upper-body restraint air-bag may include the central chamber extending along the shoulder belt and overlapping with the shoulder belt, and the left chamber and right chamber configured to receive the supply of the gas from the central chamber, in the interior. That is, the central chamber overlapping with the shoulder belt may perform the first expanding spread. Accordingly, the thickness of the upper-body restraint air-bag is secured, and the upper-body restraint air-bag is curbed from crushing due to the concentrated load by the shoulder belt. Herein, the "triangular shape" may include a "roughly triangular shape" in which an acute-angled portion is not formed.

In the vehicle occupant restraint device according to the first aspect of the present disclosure, the upper-body restraint air-bag after the completion of the expanding spread may be configured such that the left chamber and the right chamber partially overlap with the central chamber in plan sectional view.

In the vehicle occupant restraint device according to the first aspect of the present disclosure, the right and left chambers of the upper-body restraint air-bag after the completion of the expanding spread may partially overlap with the central chamber in plan sectional view. Accordingly, even when the upper body (upper half body) of the occupant is about to come down to the seat forward side due to inertial force at the time of the frontal collision of the vehicle, the upper-body restraint air-bag is curbed from being bent and deformed, and the occupant is effectively restrained.

Further, the vehicle occupant restraint device according to the first aspect of the present disclosure may further include a second check valve structure provided in the central chamber, and the second check valve structure may be configured to hold the internal pressure of the central chamber, and may include a cloth member configured to have slack so as not to close a vent hole in a middle of the expanding spread and configured to eliminate the slack so as to close the vent hole at a time of the completion of the expanding spread, the vent hole being a hole through which the gas from the inflator passes.

The vehicle occupant restraint device according to the first aspect of the present disclosure may further the second check valve structure provided in the central chamber, and the second check valve structure may be configured to hold the internal pressure of the central chamber, and may include the cloth member configured to have the slack so as not to close the vent hole through which the gas from the inflator passes, in the middle of the expanding spread, and configured to eliminate the slack so as to close the vent hole at the time of the completion of the expanding spread. Accordingly, the internal pressure of the upper-body restraint air-bag (central chamber) overlapping with the shoulder belt is effectively held, and the upper-body restraint air-bag is curbed from being bent and deformed to the opposite occupant side (seat forward side) at the shoulder belt that is a base point (support point). Further, the internal pressure of the upper-body restraint air-bag is effectively increased, and therefore the upper-body restraint air-bag is curbed from crushing due to the concentrated load by the shoulder belt.

In the vehicle occupant restraint device according to the first aspect of the present disclosure, both end portions of the upper-body restraint air-bag in the seat width direction may be coupled by a tether that is disposed on an occupant side or a strap that is disposed on the occupant side, such that the upper-body restraint air-bag has a curved shape that is convex to a seat forward side in plan view.

In the vehicle occupant restraint device according to the first aspect of the present disclosure, both end portions of the upper-body restraint air-bag in the seat width direction may be coupled by the tether that is disposed on the occupant side or the strap that is disposed on the occupant side, such that the upper-body restraint air-bag has a curved shape that is convex to a seat forward side in plan view. Accordingly, the upper-body restraint air-bag is effectively restrained from being bent and deformed to the opposite occupant side (seat forward side) at the shoulder belt that is a base point (support point). Thereby, the contact pressure to the occupant at both end portions of the upper-body restraint air-bag in the seat width direction rises, and therefore the movement amount of the upper body (upper half body) of the occupant to the seat forward side from the shoulder belt that is a base point (support point) is reduced.

Further, in the vehicle occupant restraint device according to the first aspect of the present disclosure, a shape of the upper-body restraint air-bag after the completion of the expanding spread may be a semicircular shape in the front view, and the upper-body restraint air-bag may include a central chamber, a semi-arc chamber, and a linear chamber in an interior, the central chamber extending along the shoulder belt and overlapping with the shoulder belt, the semi-arc chamber being configured such that gas is supplied in a circumferential direction from an upper end portion of the central chamber, the linear chamber being configured such that gas is supplied to a radially outer side from a central portion that is a lower end portion of the central chamber.

In the vehicle occupant restraint device according to the first aspect of the present disclosure, the shape of the upper-body restraint air-bag after the completion of the expanding spread may be a semicircular shape in front view. Accordingly, a gap is formed between the shoulder belt and the abdominal region of the occupant, and the hard press to the abdominal region of the occupant due to the concentrated load that is applied by the shoulder belt is eased. Further, the upper-body restraint air-bag may include the central chamber extending along the shoulder belt and overlapping with the shoulder belt, the semi-arc chamber configured such that the gas is supplied in the circumferential direction from the upper end portion of the central chamber, and the linear chamber configured such that the gas is supplied to the radially outer side from the central portion that is the lower end portion of the central chamber, in the interior. That is, the central chamber overlapping with the shoulder belt may perform the first expanding spread. Accordingly, the thickness of the upper-body restraint air-bag is secured, and the upper-body restraint air-bag is curbed from crushing due to the concentrated load by the shoulder belt.

Further, in the vehicle occupant restraint device according to the first aspect of the present disclosure, a shape of the upper-body restraint air-bag after a completion of the expanding spread may be a circular shape in front view, and the upper-body restraint air-bag may include a central chamber, an upper semi-arc chamber, and a lower semi-arc chamber in an interior, the central chamber extending along the shoulder belt and overlapping with the shoulder belt, the upper semi-arc chamber being configured such that gas is supplied in a circumferential direction from an upper end portion of the central chamber, the lower semi-arc chamber being configured such that gas is supplied in the circumferential direction from a lower end portion of the central chamber.

In the vehicle occupant restraint device according to the first aspect of the present disclosure, the shape of the upper-body restraint air-bag after the completion of the expanding spread may be a circular shape in front view. Accordingly, a gap is formed between the shoulder belt and the abdominal region (the lateral region of the abdomen) of the occupant, and the hard press to the abdominal region (the lateral region of the abdomen) of the occupant due to the concentrated load that is applied by the shoulder belt is eased. Further, the upper-body restraint air-bag may include the central chamber extending along the shoulder belt and overlapping with the shoulder belt, the upper semi-arc chamber configured such that the gas is supplied in the circumferential direction from the upper end portion of the central chamber, and the lower semi-arc chamber configured such that the gas is supplied in the circumferential direction from the lower end portion of the central chamber, in the interior. That is, the central chamber overlapping with the shoulder belt may perform the first expanding spread. Accordingly, the thickness of the upper-body restraint air-bag is secured, and the upper-body restraint air-bag is curbed from crushing due to the concentrated load by the shoulder belt.

As described above, with the present disclosure, it is possible to effectively restrain the occupant at the time of the frontal collision of the vehicle, regardless of the seat position.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Embodiments of the present disclosure will be described below in detail based on the drawings. For explanatory convenience, an arrow UP shown in the figures when appropriate indicates the upward direction of a vehicle and a vehicle seat, an arrow FR indicates the forward direction of the vehicle and the vehicle seat, and an arrow RH indicates the rightward direction of the vehicle and the vehicle seat. Accordingly, in the following description, up-down, front-rear, and left-right directions mean the up-down, front-rear, and left-right directions of the vehicle and the vehicle seat, unless noted otherwise. Further, the left-right direction is synonymous with a vehicle width direction and a seat width direction.

First Embodiment

Figure 1:
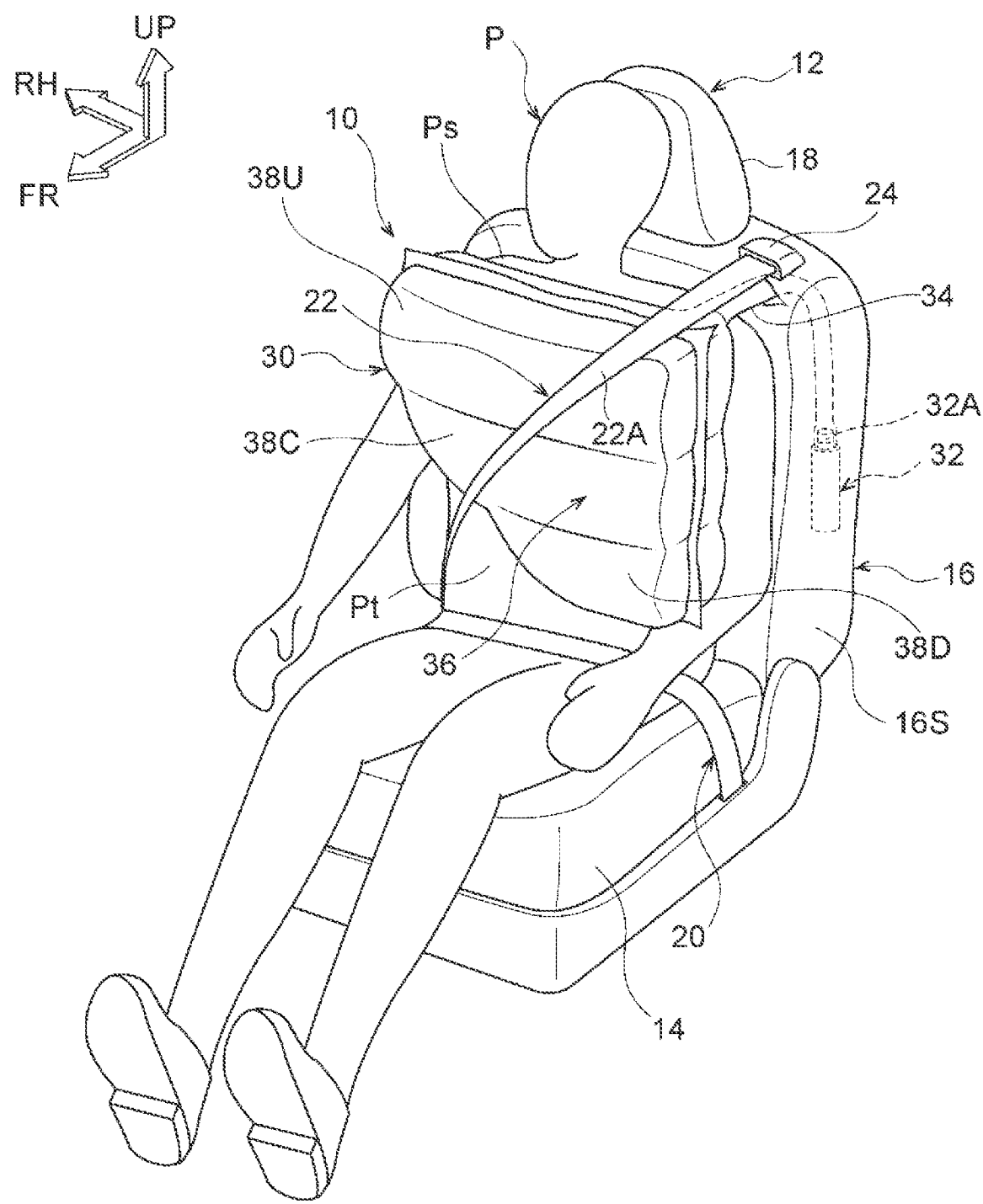
FIG. 1 is a schematic perspective view showing a state where an upper-body restraint air-bag of a vehicle occupant restraint device according to a first embodiment has performed expanding spread.

First, a first embodiment will be described. As shown in FIG. 1, a vehicle occupant restraint device 10 according to the first embodiment is provided on a vehicle seat 12. The vehicle seat 12 is a front seat or a rear seat of a vehicle (automobile), and in the first embodiment, the vehicle seat 12 is a front seat. The vehicle seat 12 includes a seat cushion 14, a seatback 16 provided at a rear end portion of the seat cushion 14 so as to be capable of pivoting such that the axial direction is the seat width direction, and a headrest 18 provided at an upper end portion of the seatback 16 so as to be capable of moving up and down.

FIG. 1 and the like illustrate a state where a dummy (human body dummy) for collision test sits on the seat cushion 14 of the vehicle seat 12, as a model for an occupant (sitting human) that needs to be protected. For example, the dummy is a frontal test dummy (Hybrid III) AM50 (50th percentile of adult male Americans). The dummy sits in a standard sitting attitude that is prescribed in a collision test method, and the vehicle seat 12 is positioned at a reference setting position corresponding to the sitting attitude. Hereinafter, the dummy is referred to as an "occupant P".

Figure 2:
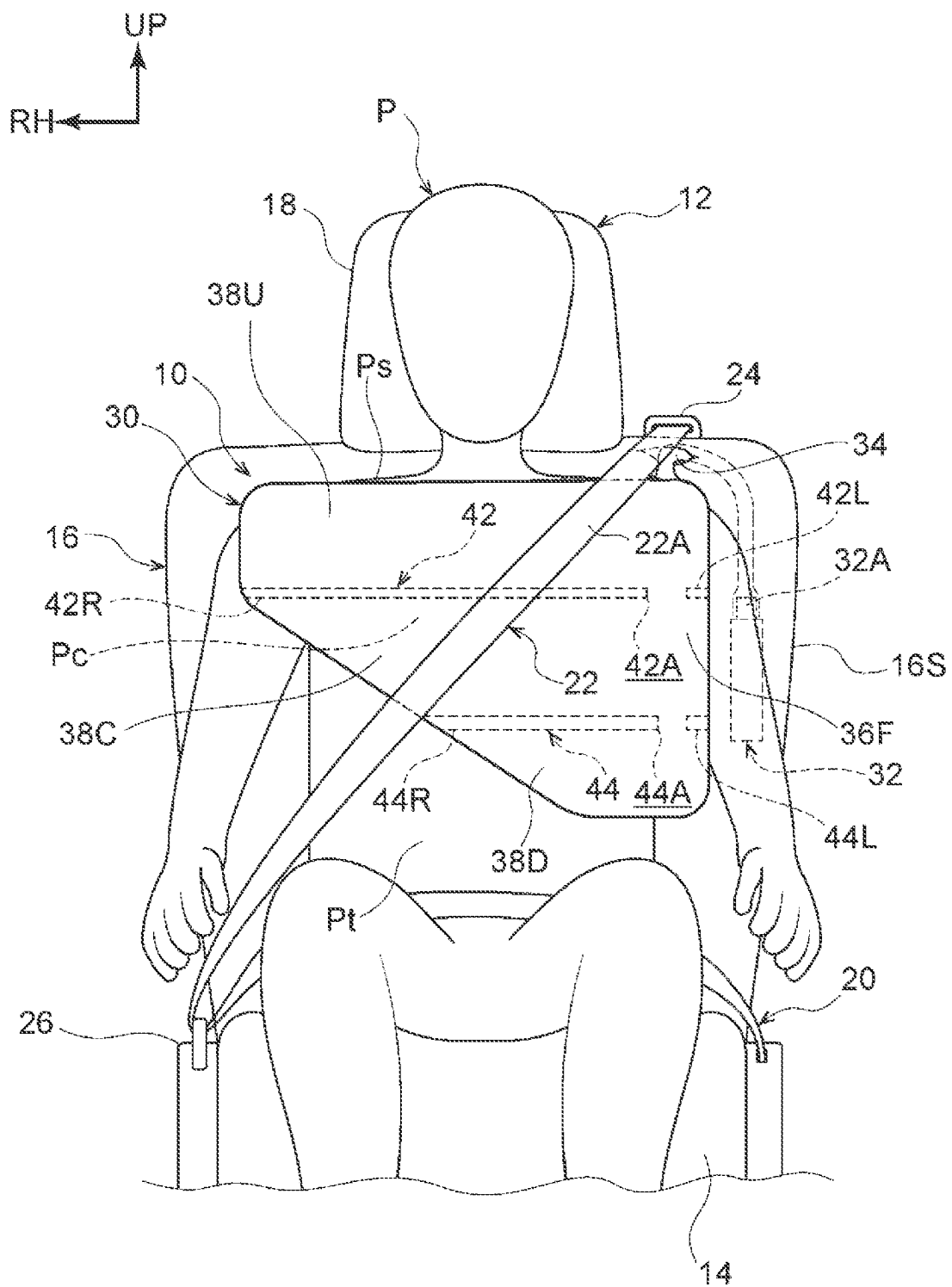
FIG. 2 is a schematic front view showing the state where the upper-body restraint air-bag of the vehicle occupant restraint device according to the first embodiment has performed the expanding spread.
Figure 3:
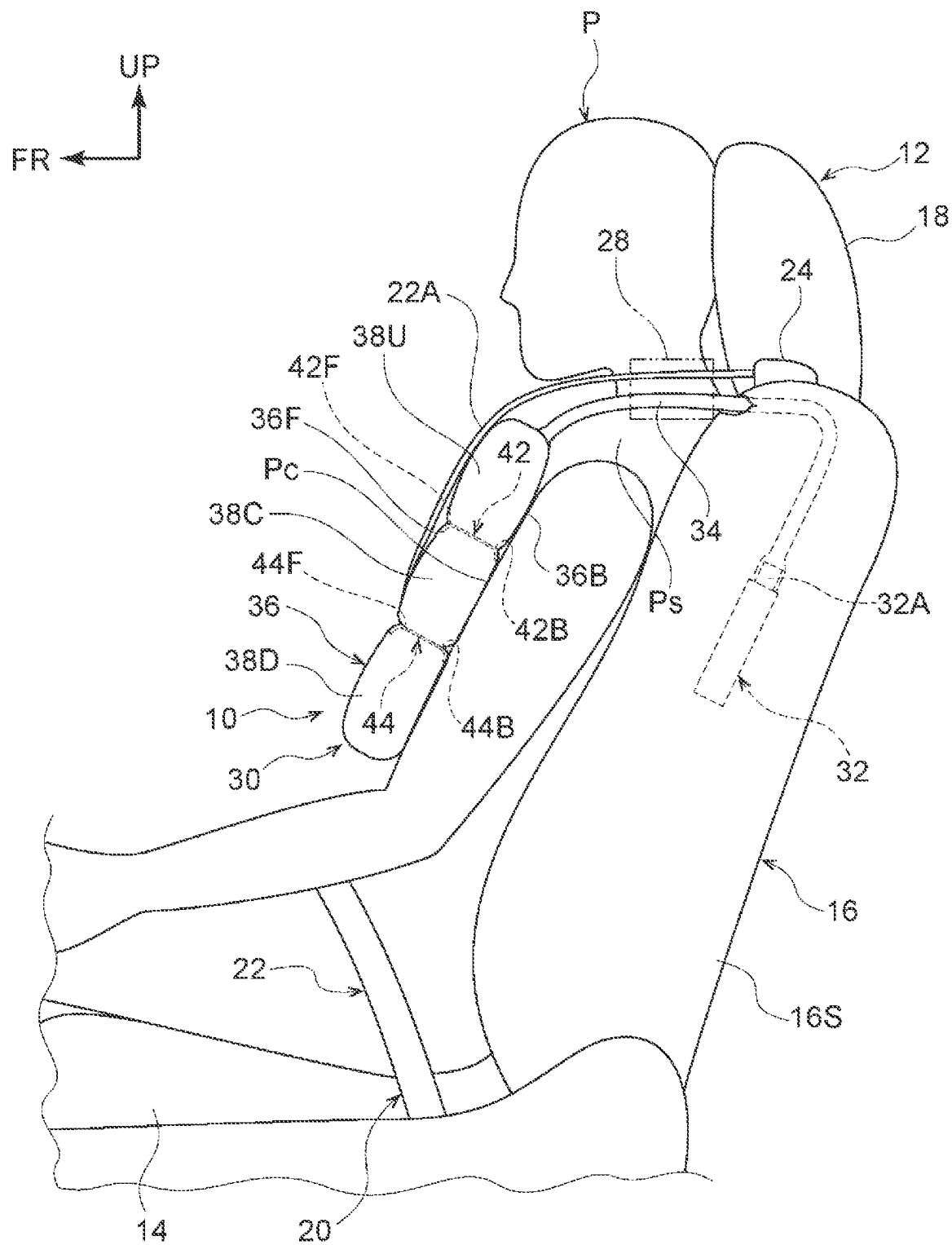
FIG. 3 is a schematic side view showing the state where the upper-body restraint air-bag of the vehicle occupant restraint device according to the first embodiment has performed the expanding spread.

As shown in FIG. 1 to FIG. 3, the occupant P sitting on the seat cushion 14 of the vehicle seat 12 is restrained on the vehicle seat 12 by a seatbelt (webbing) 22 included in a seatbelt device 20. The seatbelt device 20 is a three-point seatbelt device, and is a so-called with-seat seatbelt device in which a retractor (not illustrated) is provided at a lower portion of the seatback 16, a shoulder belt anchorage 24 is provided on the left side (one end portion side in the seat width direction) of an upper end surface of the seatback 16, and a buckle 26 is provided on the right side (the other end portion side in the seat width direction) of the seat cushion 14. Hereinafter, a part of the seatbelt 22 that extends between a shoulder region Ps and abdominal region Pt of the occupant P is referred to as a shoulder belt 22A.

The vehicle seat 12 is provided with an air-bag device 30. The air-bag device 30 includes an inflator 32 that is buried in a side portion 16S on the left side of the seatback 16, and an upper-body restraint air-bag 36 that is held integrally with a cover member 28 (see FIG. 3) while being folded at normal times and that is disposed such that the cover member 28 is attached to the occupant P side (back surface side) of an upper portion (an upward side of the shoulder region Ps of the occupant P) of the shoulder belt 22A.

For example, the inflator 32 is a gas filling type (cold type) circular cylinder inflator, and generates gas by being actuated by a control device (not illustrated) provided in the vehicle when an unillustrated collision sensor (including a camera and the like) detects the frontal collision of the vehicle or expects (predicts) that it is impossible to avoid the frontal collision (referred to as "the time of the frontal collision of the vehicle", hereinafter).

That is, the control device is electrically connected with the inflator 32 and the collision sensor (including a camera and the like), and actuates the inflator 32 based on information from the collision sensor, at the time of the frontal collision of the vehicle. The manner of the frontal collision of the vehicle when the control device actuates the inflator 32 includes offset frontal collision such as oblique collision and small overlap collision, in addition to full-wrap frontal collision.

For example, the inflator 32 is attached to a side frame (not illustrated) on the left side of the seatback 16 such that the axial direction is a roughly up-down direction, and an ejection port 32A at an upper end portion of the inflator 32 is connected so as to communicate with one end portion (lower end portion) of a gas supply duct 34 composed of a flexible tube or the like. The other end portion (upper end portion) of the gas supply duct 34 protrudes from the seatback 16 on the downward side of the shoulder belt anchorage 24, and is connected so as to communicate with the upper-body restraint air-bag 36.

That is, the upper-body restraint air-bag 36 is configured to receive the supply of the gas from the inflator 32 through the gas supply duct 34 that passes through the downward side of the shoulder belt anchorage 24. Thereby, the upper-body restraint air-bag 36 can perform expanding spread between the shoulder belt 22A and a chest region Pc of the occupant P, and can restrain at least the chest region Pc of the occupant P.

In the upper-body restraint air-bag 36 after the completion of the expanding spread, the front-view area of an opposite shoulder belt 22A side (right side) that is the opposite side of the shoulder belt 22A side (left side) is set so as to be smaller than the front-view area of the shoulder belt 22A side. More specifically, the shape of the upper-body restraint air-bag 36 after the completion of the expanding spread is a roughly right triangle shape in which the lower right side (opposite shoulder belt 22A side) is eliminated to form an oblique side in front view (a right triangle shape in which a right end portion and a lower end portion have no right interior angle and no acute angle) (see FIG. 2).

Accordingly, the upper-body restraint air-bag 36 is configured such that the shoulder belt 22A side restrains the occupant P from the shoulder region Ps to the abdominal region Pt and the opposite shoulder belt 22A side restrains the occupant P from the shoulder region Ps to the chest region Pc. Moreover, in the interior, the upper-body restraint air-bag 36 includes chambers 38 that extend along the seat width direction, at a plurality of stages (for example, three stages).

Specifically, the upper-body restraint air-bag 36 is formed in a saclike shape, by overlapping two base cloths having a roughly right triangle shape in front view, that is, a base cloth 36F constituting a front wall of the upper-body restraint air-bag 36 and a base cloth 36B constituting a rear wall of the upper-body restraint air-bag 36 and sewing peripheral edge portions of the base cloths 36F, 36B to each other. The base cloths 36F, 36B are composed of a polyamide or polyester cloth material, for example.

Moreover, as shown in FIG. 2 and FIG. 3, in the interior of the upper-body restraint air-bag 36, a plurality of (for example, two) tethers 42, 44 that is formed of cloth and that links the base cloth 36F and the base cloth 36B is attached at an interval so as to be arranged in the up-down direction. In other words, the upper-body restraint air-bag 36 is partitioned into the chambers 38 at the plurality of stages (for example, three stages), by the plurality of (for example, two) tethers 42, 44 provided in the interior. The tethers 42, 44 are also composed of a polyamide or polyester cloth material, for example.

The longitudinal direction of the tether 42 on the upper side is the seat width direction. A front end portion 42F of the tether 42 is sewed to the base cloth 36F, and a rear end portion 42B of the tether 42 is sewed to the base cloth 36B. Moreover, a left end portion 42L of the tether 42 is sewed to the peripheral edge portions on the left side (one end portion side in the seat width direction) of the base cloths 36F, 36B, and a right end portion 42R of the tether 42 is sewed to the peripheral edge portions on the right side (the other end portion side in the seat width direction) of the base cloths 36F, 36B.

By the tether 42 on the upper side, a chamber (referred to as an "upper-stage chamber", hereinafter) 38U at the highest stage and a chamber (referred to as a "central-stage chamber", hereinafter) 38C at the central stage are partitioned. An opening portion 42A that is a through-hole having a circular shape is formed at a left-side portion of the tether 42, and the gas can be supplied from the upper-stage chamber 38U to the central-stage chamber 38C, as described later.

Similarly, the longitudinal direction of the tether 44 on the lower side is the seat width direction. A front end portion 44F of the tether 44 is sewed to the base cloth 36F, and a rear end portion 44B of the tether 44 is sewed to the base cloth 36B. Moreover, a left end portion 44L of the tether 44 is sewed to the peripheral edge portions on the left side (one end portion side in the seat width direction) of the base cloths 36F, 36B, and a right end portion 44R of the tether 44 is sewed to the peripheral edge portions on the right side (the other end portion side in the seat width direction) of the base cloths 36F, 36B.

By the tether 44 on the lower side, the central-stage chamber 38C and a chamber (referred to as a "lower-stage chamber", hereinafter) 38D at the lowest stage are partitioned. An opening portion 44A that is a through-hole having a circular shape is formed at a left-side portion of the tether 44, and the gas can be supplied from the central-stage chamber 38C to the lower-stage chamber 38D, as described later.

In the upper-body restraint air-bag 36, the gas is sequentially supplied from the upper-stage chamber 38U to the lower-stage chamber 38D. Moreover, check valve structures 40 (see FIG. 4, FIG. 5A, and FIG. 5B) for holding the internal pressure are provided in the upper-stage chamber 38U and the central-stage chamber 38C, and the gas is sequentially charged from the upper-stage chamber 38U through the central-stage chamber 38C to the lower-stage chamber 38D.

Figure 4:
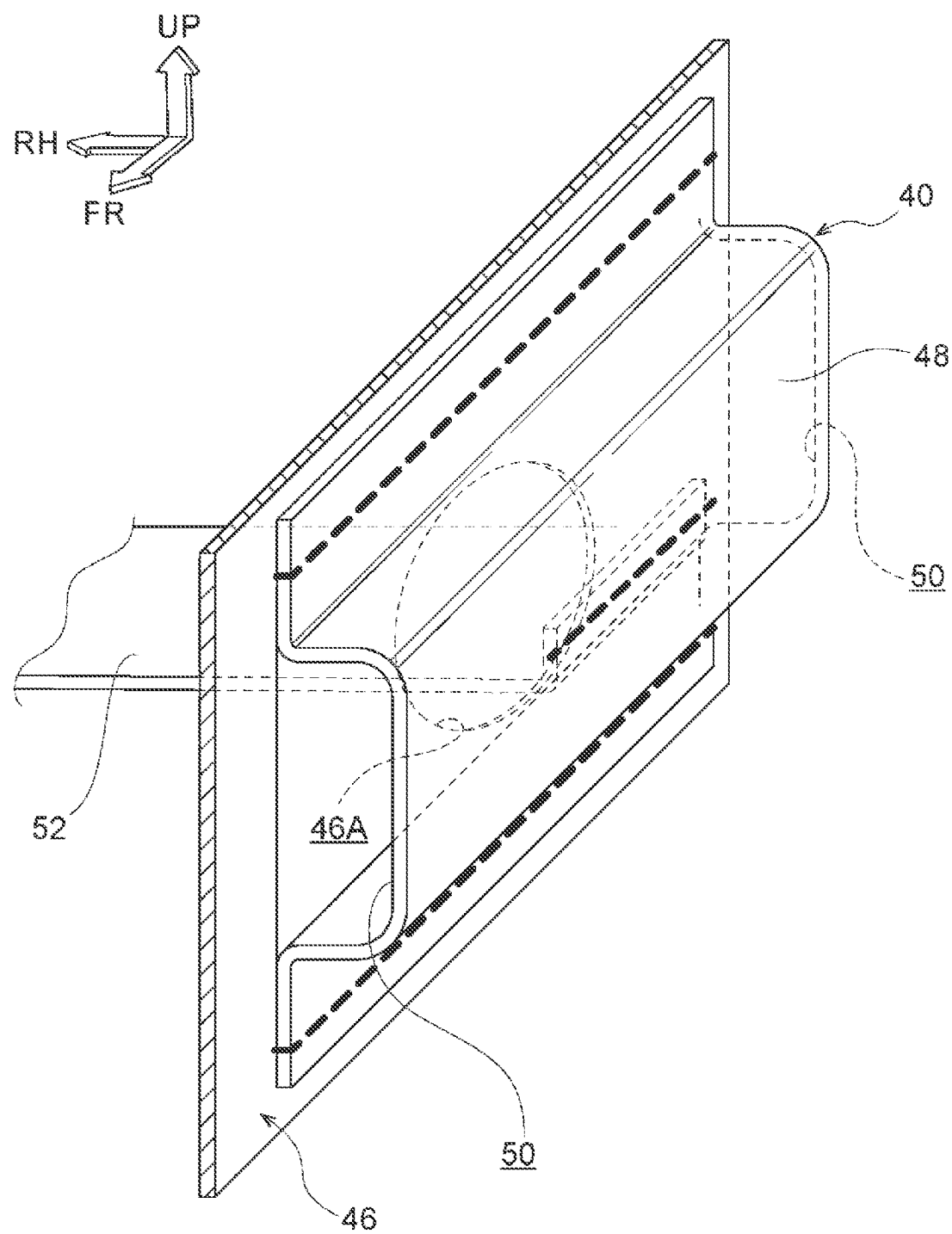
FIG. 4 is a schematic perspective view showing a check valve structure provided in the interior of the upper-body restraint air-bag of the vehicle occupant restraint device according to the first embodiment.
Figure 5A:
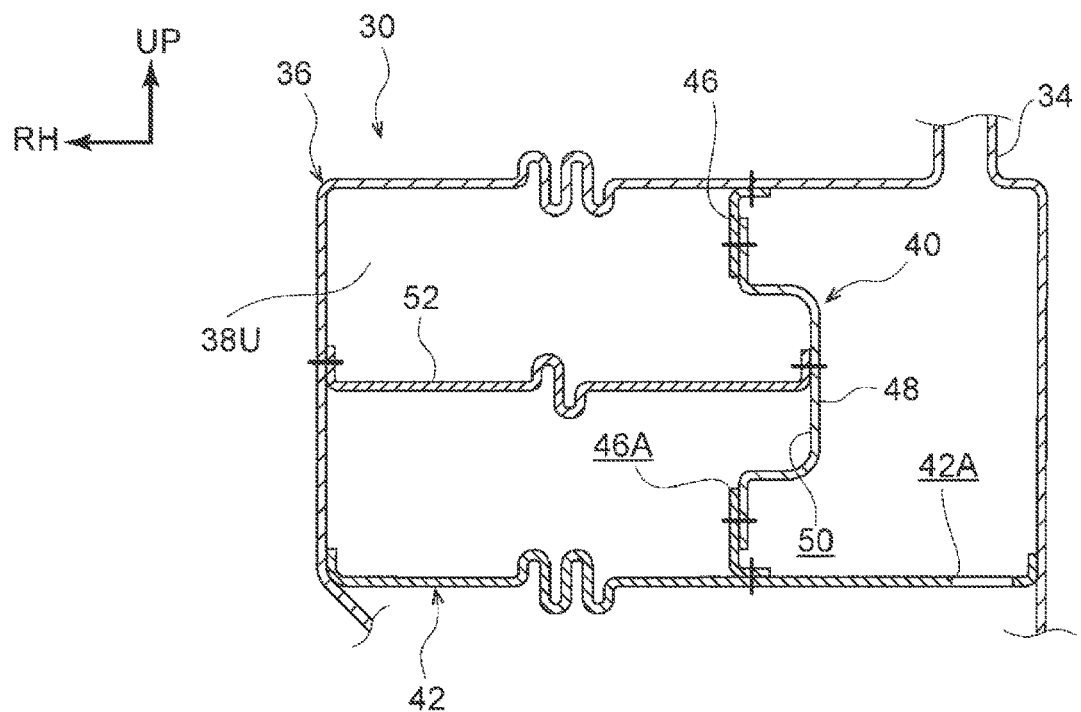
FIG. 5A is a schematic sectional view showing a state before closing of a vent hole in the check valve structure provided in the interior of the upper-body restraint air-bag of the vehicle occupant restraint device according to the first embodiment.
Figure 5B:
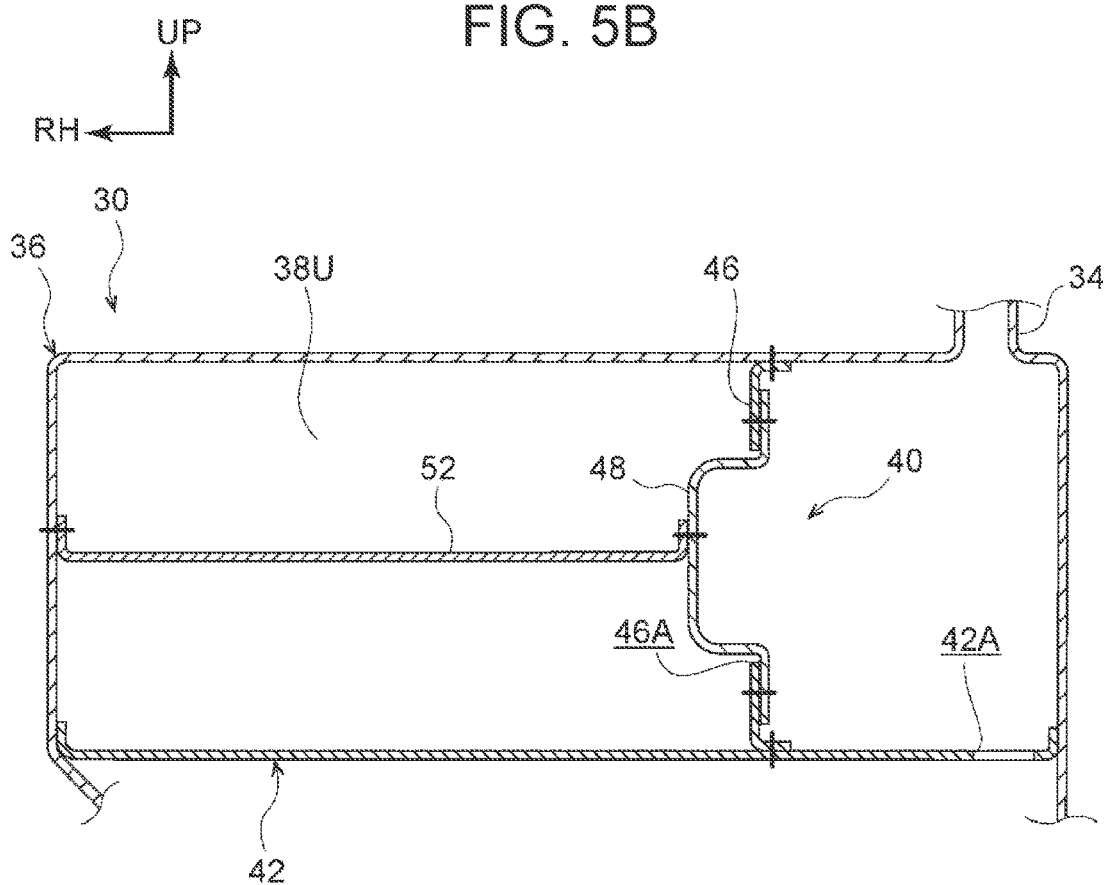
FIG. 5B is a schematic sectional view showing a state after the closing of the vent hole in the check valve structure provided in the interior of the upper-body restraint air-bag of the vehicle occupant restraint device according to the first embodiment.

As shown in FIG. 4, FIG. 5A, and FIG. 5B, a left-side portion (a portion on one end portion side in the seat width direction) at the upper-side peripheral edge portions of the base cloths 36F, 36B and a left-side portion (a portion on one end portion side in the seat width direction) of the tether 42 on the upper side are linked by a partition cloth 46. That is, an upper end portion of the partition cloth 46 is sewed to the left-side portion at the upper-side peripheral edge portions of the base cloths 36F, 36B, and a lower end portion of the partition cloth 46 is sewed to the left-side portion of the tether 42. Moreover, a front end portion of the partition cloth 46 is sewed to the base cloth 36F, and a rear end portion of the partition cloth 46 is sewed to the base cloth 36B.

A vent hole 46A that is a through-hole having, for example, a circular shape is formed at a central portion of the partition cloth 46, and a moving cloth 48 having a rectangular shape is provided on the leftward side (seat width directional outer side) of the partition cloth 46. The moving cloth 48 serves as a cloth member that has slack so as to open the vent hole 46A before the completion of the expanding spread of the upper-body restraint air-bag 36 (in the middle of the expanding spread) and that closes the vent hole 46A at the time of the completion of the expanding spread of the upper-body restraint air-bag 36.

Specifically, the length of the moving cloth 48 in the up-down direction is equal to or longer than the length of the partition cloth 46 in the up-down direction. An upper end portion of the moving cloth 48 is sewed to an upper portion of the partition cloth 46 that is a portion just above the vent hole 46A, and a lower end portion of the moving cloth 48 is sewed to a lower portion of the partition cloth 46 that is a portion just below the vent hole 46A.

Thereby, before the completion of the expanding spread of the upper-body restraint air-bag 36 (in the middle of the expanding spread), the slack is formed at an up-down directional central portion of the moving cloth 48. Moreover, the slacked moving cloth 48 and the partition cloth 46 forms an opening portion 50 that is opened in the front-rear direction and that communicates with the vent hole 46A.

One end portion of a pulling cloth 52 in which the longitudinal direction is the seat width direction is sewed to an inner surface (a surface facing the vent hole 46A) of the moving cloth 48, and the other end portion of the pulling cloth 52 passes through the vent hole 46A and is sewed to a peripheral edge portion on the right side (the other end portion side in the seat width direction) of the base cloths 36F, 36B.

Accordingly, the check valve structure 40 is actuated as follows. When the gas is supplied to the interior of the upper-body restraint air-bag 36, the gas first passes through the opening portion 50 and the vent hole 46A, and is supplied to the interior of the upper-stage chamber 38U, as shown in FIG. 5A. Thereby, the upper-stage chamber 38U performs the expanding spread toward the right side (the other end portion side in the seat width direction).

Then, the pulling cloth 52 having the other end portion sewed to the peripheral edge portion on the right side of the upper-stage chamber 38U is pulled to the right side (the other end portion side in the seat width direction), and therefore, the moving cloth 48 to which the one end portion of the pulling cloth 52 is sewed through the vent hole 46A is pulled to the right side by the pulling cloth 52. Thereby, as shown in FIG. 5B, the moving cloth 48 is pulled into the vent hole 46A (upper-stage chamber 38U), and closes the vent hole 46A. That is, the upper-stage chamber 38U after the expanding spread is sealed.

When the vent hole 46A is closed by the moving cloth 48 (when the upper-stage chamber 38U after the expanding spread is sealed), the gas supplied to the upper-body restraint air-bag 36 passes through the opening portion 42A of the tether 42 on the upper side, is supplied to the central-stage chamber 38C, so that the central-stage chamber 38C after the expanding spread is sealed by the check valve structure 40 provided in the central-stage chamber 38C. Then, when the central-stage chamber 38C after the expanding spread is sealed, the gas supplied to the upper-body restraint air-bag 36 passes through the opening portion 44A of the tether 44 on the lower side, and is supplied to the lower-stage chamber 38D, so that the lower-stage chamber 38D performs the expanding spread (see FIG. 8A, FIG. 8B, and FIG. 8C).

Figure 6:
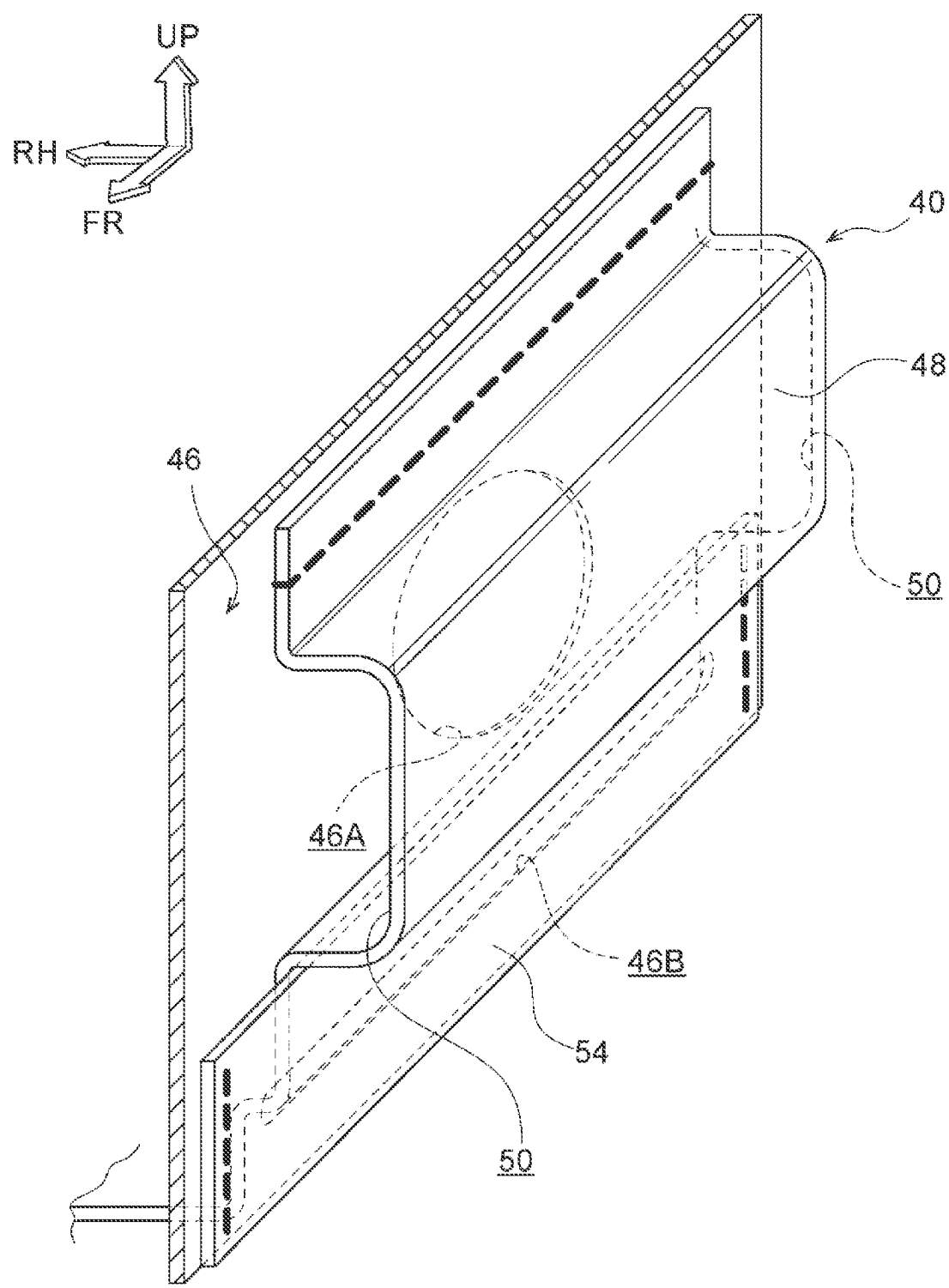
FIG. 6 is a schematic perspective view showing a modification of the check valve structure provided in the interior of the upper-body restraint air-bag of the vehicle occupant restraint device according to the first embodiment.

In this way, in the check valve structure 40, the moving cloth 48 is configured to have the slack so as not to close the vent hole 46A through which the gas from the inflator 32 passes before the completion of the expanding spread (in the middle of the expanding spread), and is configured to eliminate the slack so as to close the vent hole 46A at the time of the completion of the expanding spread. The thicknesses of the upper-stage chamber 38U, the central-stage chamber 38C, and the lower-stage chamber 38D after the completion of the expanding spread are equivalent to each other. The configuration of the check valve structure 40 is not limited to the configuration shown in FIG. 4, FIG. 5A, and FIG. 5B, and may be a configuration shown in FIG. 6, FIG. 7A, and FIG. 7B, for example.

That is, it is allowable to adopt a configuration in which the lower end portion of the moving cloth 48 is not sewed to the partition cloth 46 and the lower end portion of the moving cloth 48 functions as the pulling cloth 52. Specifically, the length of the moving cloth 48 in the up-down direction is further increased, the lower end portion of the moving cloth 48 is extended, and a slit portion 46B into which the lower end portion of the moving cloth 48 can be inserted is formed at a lower portion of the partition cloth 46 just below the vent hole 46A. Moreover, a reinforcing cloth 54 that closes the slit portion 46B is sewed to an outer surface (slacked moving cloth 48 side) of the partition cloth 46.

The reinforcing cloth 54 is formed in a rectangular shape in which the longitudinal direction is the front-rear direction, a front end portion of the reinforcing cloth 54 is sewed to a front portion of the partition cloth 46, and a rear end portion of the reinforcing cloth 54 is sewed to a rear portion of the partition cloth 46. Moreover, the lower end portion of the moving cloth 48 is inserted into a gap between the partition cloth 46 and the reinforcing cloth 54 from an upward side, is inserted into the slit portion 46B, and is pulled into the upper-stage chamber 38U.

Thereby, the moving cloth 48 is slacked on the upward side of the reinforcing cloth 54, and the slacked moving cloth 48 and the partition cloth 46 forms an opening portion 50 that is opened in the front-rear direction and that communicates with the vent hole 46A. Moreover, the lower end portion of the moving cloth 48 that is pulled into the upper-stage chamber 38U is sewed and attached to a portion on the right side (the other end portion side in the seat width direction) of a seat width directional central portion of the tether 42 on the upper side.

Figure 7A:
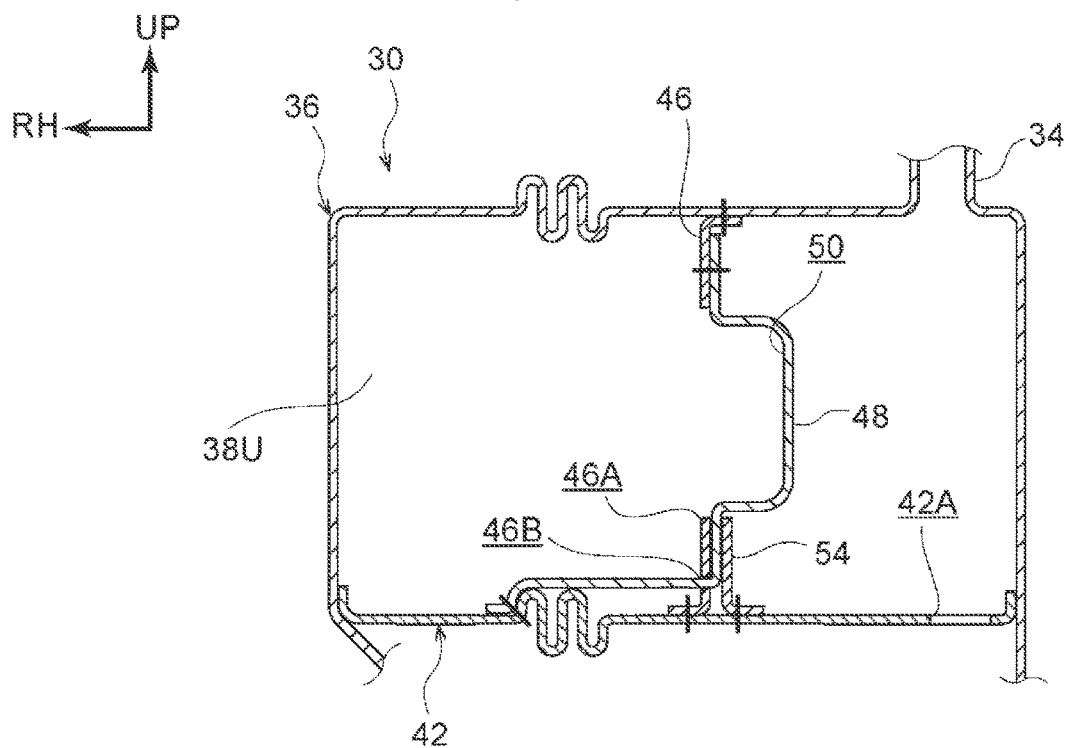
FIG. 7A is a schematic sectional view showing a state before the closing of the vent hole in the modification of the check valve structure provided in the interior of the upper-body restraint air-bag of the vehicle occupant restraint device according to the first embodiment.

Accordingly, the check valve structure 40 is actuated as follows. When the gas is supplied to the interior of the upper-body restraint air-bag 36, the gas first passes through the opening portion 50 and the vent hole 46A, and is supplied to the interior of the upper-stage chamber 38U, as shown in FIG. 7A. Thereby, the upper-stage chamber 38U performs the expanding spread toward the right side (the other end portion side in the seat width direction).

Figure 7B:
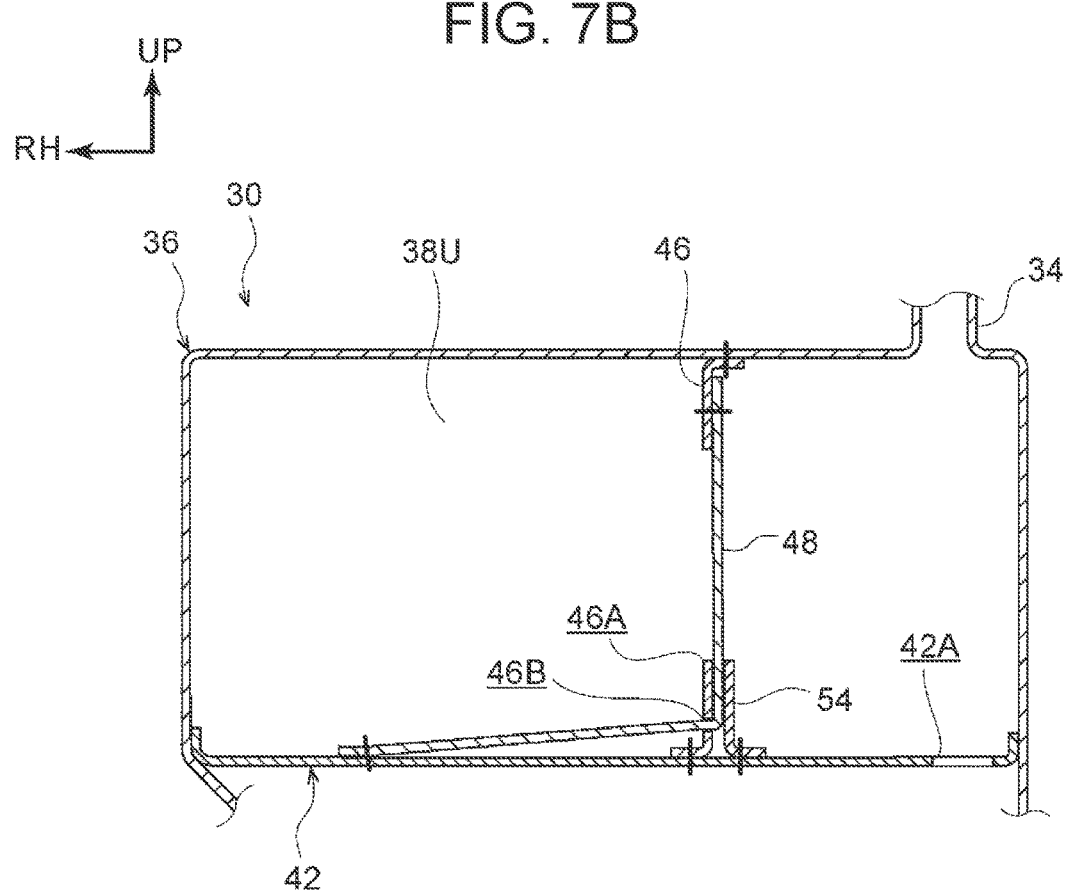
FIG. 7B is a schematic sectional view showing a state after the closing of the vent hole in the modification of the check valve structure provided in the interior of the upper-body restraint air-bag of the vehicle occupant restraint device according to the first embodiment.

Then, the moving cloth 48 having the lower end portion sewed to the portion on the right side of the seat width directional central portion of the tether 42 configuring the upper-stage chamber 38U is pulled to the right side (the other end portion side in the seat width direction). Thereby, as shown in FIG. 7B, the moving cloth 48 is pulled to the downward side, and closes the vent hole 46A. That is, the upper-stage chamber 38U after the expanding spread is sealed.

When the vent hole 46A is closed by the moving cloth 48 (when the upper-stage chamber 38U after the expanding spread is sealed), the gas supplied to the upper-body restraint air-bag 36 passes through the opening portion 42A of the tether 42 on the upper side, is supplied to the central-stage chamber 38C, so that the central-stage chamber 38C after the expanding spread is sealed by the check valve structure 40 provided in the central-stage chamber 38C. Then, when the central-stage chamber 38C after the expanding spread is sealed, the gas supplied to the upper-body restraint air-bag 36 passes through the opening portion 44A of the tether 44 on the lower side, and is supplied to the lower-stage chamber 38D, so that the lower-stage chamber 38D performs the expanding spread (see FIG. 8A, FIG. 8B, and FIG. 8C). The check valve structure 40 provided in the upper-stage chamber 38U can be regarded as an example of the first check valve structure.

Next, the operation of the vehicle occupant restraint device 10 according to the first embodiment configured in this way will be described.

Figure 8A:
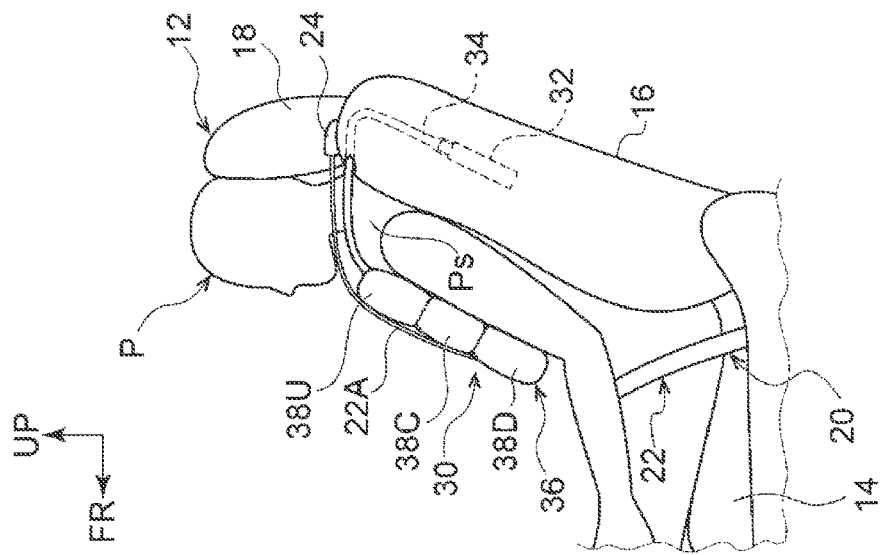
FIG. 8A is a schematic side view showing a state before the expanding spread of the upper-body restraint air-bag of the vehicle occupant restraint device according to the first embodiment.

At the time of the frontal collision of the vehicle, the inflator 32 is actuated by the control from the control device. That is, the gas is ejected from the inflator 32. Then, the gas ejected from the inflator 32 passes through the gas supply duct 34, and is supplied into the upper-body restraint air-bag 36. That is, as shown in FIG. 8A, the gas is supplied to the interior of the folded upper-body restraint air-bag 36 disposed on the occupant P side (back surface side) of the shoulder belt 22A by the cover member 28.

Figure 8B:
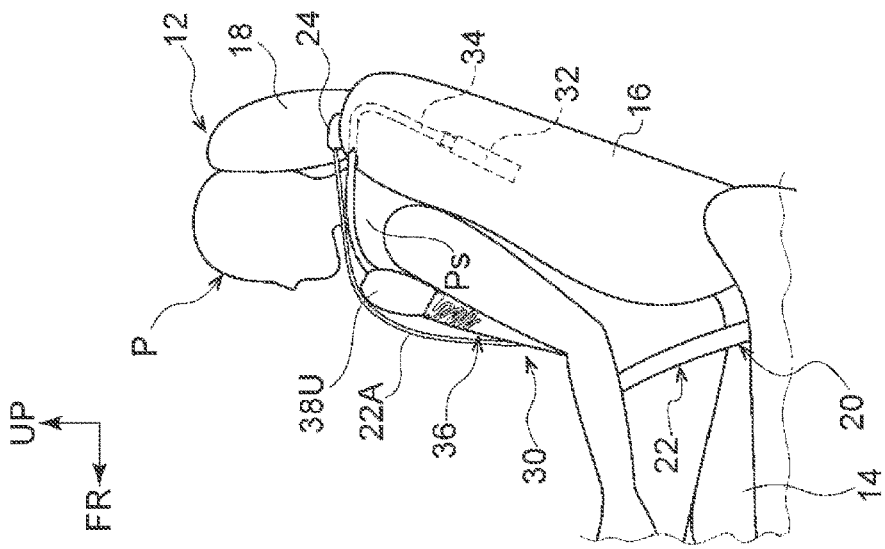
FIG. 8B is a schematic side view showing a state in the middle of the expanding spread of the upper-body restraint air-bag of the vehicle occupant restraint device according to the first embodiment.

Then, as shown in FIG. 8B (the cover member 28 is not illustrated in FIG. 8B), first, the gas is supplied to the upper-stage chamber 38U, and the upper-stage chamber 38U performs the expanding spread. Then, when the upper-stage chamber 38U after the expanding spread is sealed by the above check valve structure 40, the gas passes through the opening portion 42A of the tether 42 on the upper side, and is supplied to the central-stage chamber 38C, so that the central-stage chamber 38C performs the expanding spread.

Figure 8C:
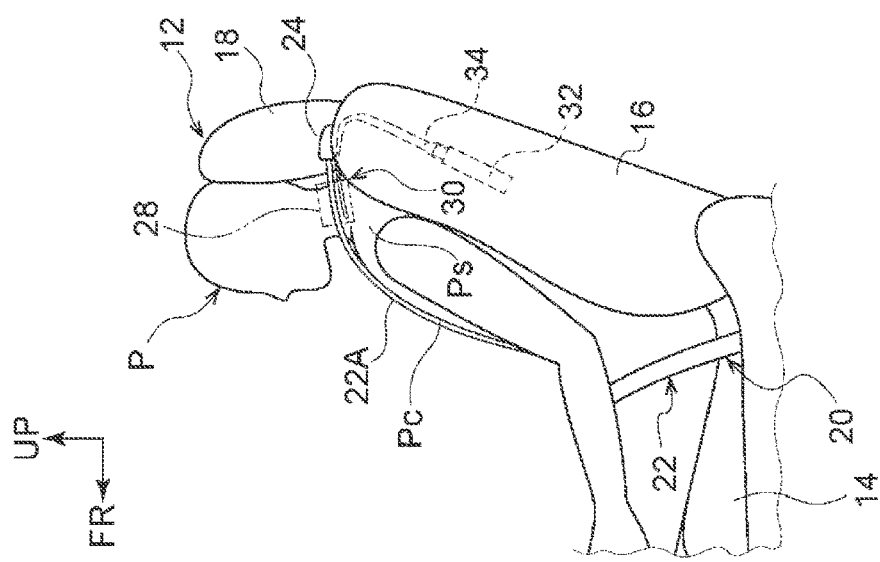
FIG. 8C is a schematic side view showing a state after the completion of the expanding spread of the upper-body restraint air-bag of the vehicle occupant restraint device according to the first embodiment.

Thereafter, when the central-stage chamber 38C after the expanding spread is sealed by the above check valve structure 40, the gas passes through the opening portion 44A of the tether 44 on the lower side, and is supplied to the lower-stage chamber 38D, so that the lower-stage chamber 38D performs the expanding spread as shown in FIG. 8C (the cover member 28 is not illustrated in FIG. 8C).

Thereby, the upper-body restraint air-bag 36 after the expanding spread is disposed between the shoulder belt 22A and the chest region Pc of the occupant P (on the rearward side of the shoulder belt 22A and on the forward side of the occupant P), and at least the chest region Pc of the occupant P is restrained. That is, the shoulder belt 22A serves as a receiving member for the reaction force of the upper-body restraint air-bag 36, and the upper-body restraint air-bag 36 effectively restrains the occupant P that is about to inertially move to the forward side due to the impact at the time of the frontal collision of the vehicle.

Accordingly, for example, during autonomous driving, even when the occupant P sitting in the vehicle seat 12 such as a driver's seat and an assistant driver's seat, adopts such a position that the vehicle seat 12 is significantly away from a steering wheel (not illustrated) or the air-bag (not illustrated) to perform the expanding spread toward the front of the occupant P, to the rearward side, the occupant P can be effectively restrained by the upper-body restraint air-bag 36. That is, with the upper-body restraint air-bag 36, it is possible to effectively restrain the occupant P at the time of the frontal collision of the vehicle, regardless of the seat position of the vehicle seat 12.

Moreover, since the upper-body restraint air-bag 36 performs the expanding spread between the shoulder belt 22A and the chest region Pc of the occupant P, the concentrated load that is applied to the chest region Pc of the occupant P by the shoulder belt 22A is distributed over a wider range on the chest region Pc of the occupant P. Accordingly, it is possible to reduce the injury value of the chest region Pc of the occupant P that has a relatively low chest region tolerance, as exemplified by women and elderly persons.

Further, the upper-body restraint air-bag 36 is attached to the occupant P side (back surface side) of the shoulder belt 22A by the cover member 28, while being folded. The shoulder belt anchorage 24 of the seatbelt 22 and the inflator 32 are provided at the seatback 16 of the vehicle seat 12. Moreover, the upper-body restraint air-bag 36 receives the supply of the gas from the inflator 32 through the gas supply duct 34 that passes through the downward side of the shoulder belt anchorage 24. That is, these constituent components are provided at the vehicle seat 12.

Accordingly, with the vehicle occupant restraint device 10 according to the first embodiment, it is possible to effectively restrain the occupant P at the time of the frontal collision of the vehicle, regardless of the seat position of the vehicle seat 12, and in addition, it is possible to easily equip the vehicle occupant restraint device 10 in the vehicle because the vehicle seat 12 only needs to be mounted.

Further, in the upper-body restraint air-bag 36 after the completion of the expanding spread, the area of the opposite shoulder belt 22A side that is the opposite side of the shoulder belt 22A side in the front view is set so as to be smaller than the area of the shoulder belt 22A side in the front view. By the upper-body restraint air-bag 36, the shoulder belt 22A side restrains the occupant P from the shoulder region Ps to the abdominal region Pt, and the opposite shoulder belt 22A side restrains the occupant P from the shoulder region Ps to the chest region Pc. That is, with the upper-body restraint air-bag 36, it is possible to generate a moderate restraining force to the shoulder region Ps on the opposite shoulder belt 22A side on which the shoulder belt 22A is not put. Accordingly, it is possible to efficiently restrain the right and left shoulder regions Ps of the occupant P.

Further, with the upper-body restraint air-bag 36, it is possible to distribute and reduce the input load that is applied to the chest region Pc and abdominal region Pt (including a lateral region of the abdomen) of the occupant P by the shoulder belt 22A. Specifically, the shape of the upper-body restraint air-bag 36 after the completion of the expanding spread is the above roughly right triangle shape in front view, and therefore, by the upper-body restraint air-bag 36, it is possible to form the gap between the shoulder belt 22A and the abdominal region Pt of the occupant P. Accordingly, it is possible to ease the hard press to the abdominal region Pt of the occupant P due to the concentrated load that is applied by the shoulder belt 22A.

Further, in the interior of the upper-body restraint air-bag 36, the chambers 38 that extend along the seat width direction are provided at the plurality of stages (for example, three stages), and the gas is supplied (charged) from the upper-stage chamber 38U through the central-stage chamber 38C to the lower-stage chamber 38D. That is, the upper-stage chamber 38U performs the first expanding spread. Accordingly, it is possible to stabilize the position of the shoulder belt 22A. Further, since the upper-stage chamber 38U performs the first expanding spread, it is possible to efficiently form gaps that smooth the expanding spreads of the chambers that are performed in the order of the upper-stage chamber 38U, the central-stage chamber 38C, and the lower-stage chamber 38D.

Further, in the upper-body restraint air-bag 36, the check valve structures 40 for holding the internal pressure are provided in the upper-stage chamber 38U and the central-stage chamber 38C. The check valve structure 40 is configured to include the moving cloth 48 that has the slack so as not to close the vent hole 46A through which the gas from the inflator 32 passes, before the completion of the expanding spread (in the middle of the expanding spread), and that eliminates the slack so as to close the vent hole 46A at the time of the completion of the expanding spread.

Accordingly, it is possible to effectively hold the internal pressure of the upper-body restraint air-bag 36 overlapping with the shoulder belt 22A, and it is possible to curb or prevent the upper-body restraint air-bag 36 from being bent and deformed to the opposite occupant P side (forward side) at the shoulder belt 22A that is a base point (support point). Further, since it is possible to effectively increase the internal pressure of the upper-body restraint air-bag 36 in this way, it is possible to curb or prevent the upper-body restraint air-bag 36 from crushing due to the concentrated load by the shoulder belt 22A.

Second Embodiment

Next, a second embodiment will be described. Sites equivalent to those in the first embodiment are denoted by identical reference characters, and detailed descriptions (including common operations) thereof are omitted when appropriate.

Figure 9A:
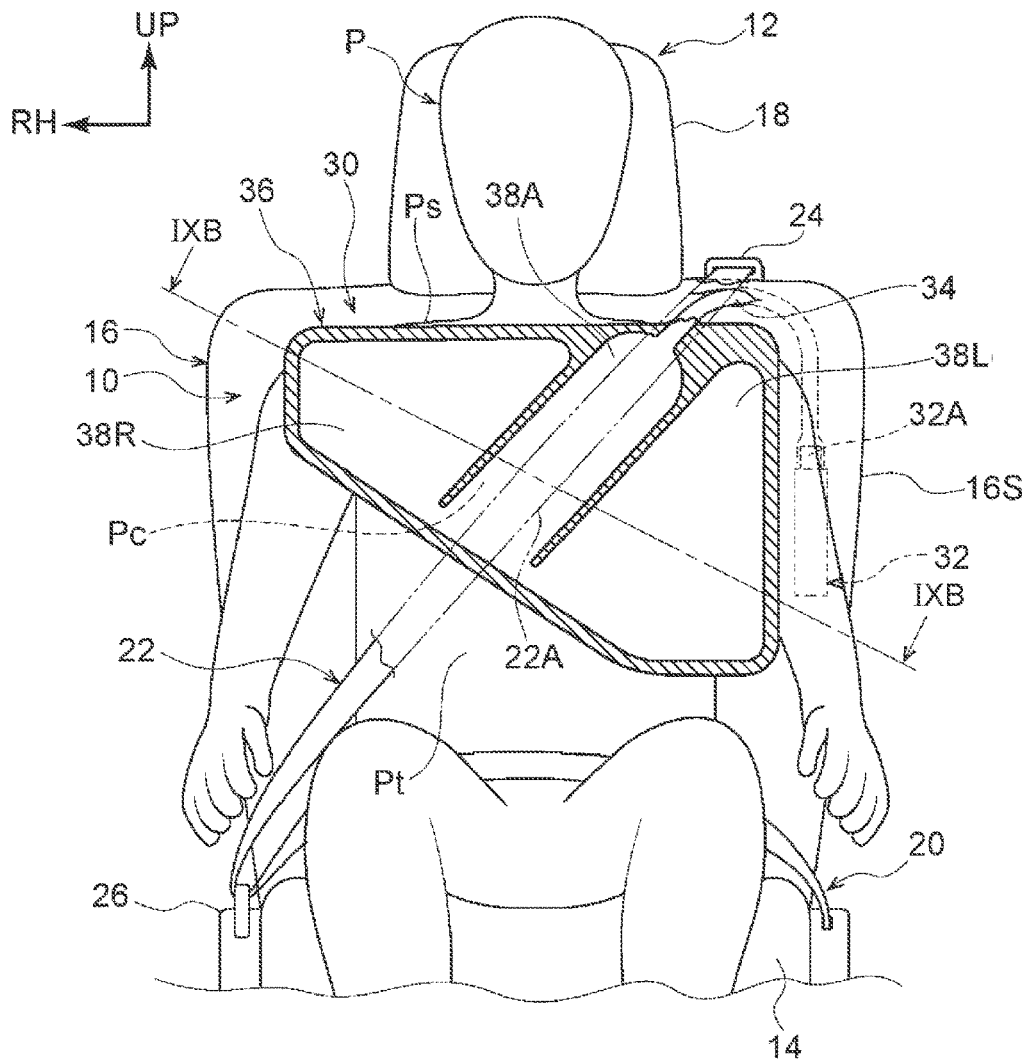
FIG. 9A is a schematic front view showing, as a section, a state where an upper-body restraint air-bag of a vehicle occupant restraint device according to a second embodiment has performed the expanding spread.
Figure 9B:
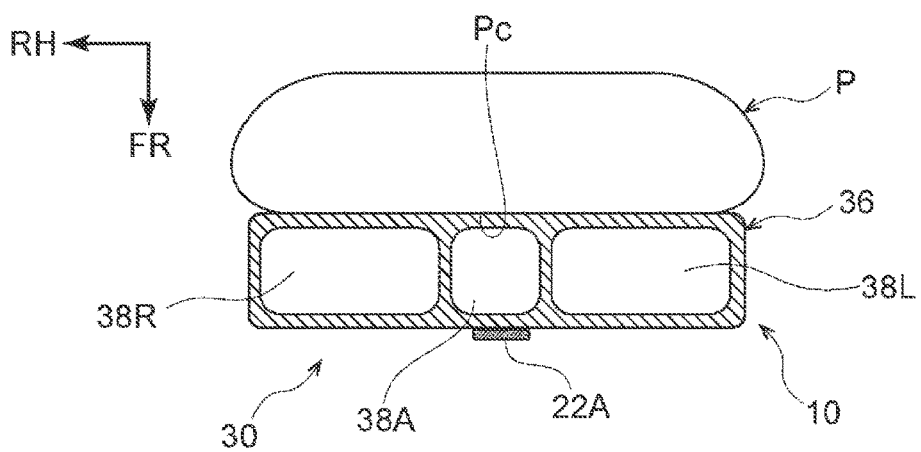
FIG. 9B is a schematic sectional view as viewed in the direction of line arrow IXB-IXB in FIG. 9A.

As shown in FIG. 9A and FIG. 9B, the second embodiment is different from the first embodiment, only in the internal structure of the upper-body restraint air-bag 36. That is, the second embodiment is different from the first embodiment, only in that the upper-body restraint air-bag 36 includes a central chamber 38A that extends along the shoulder belt 22A and that overlaps with the shoulder belt 22A, and a left chamber 38L and a right chamber 38R as left and right chambers that receive the supply of the gas from the central chamber 38A, in the interior.

An upper end portion of the central chamber 38A is connected so as to communicate with the other end portion (upper end portion) of the gas supply duct 34, and the gas ejected from the inflator 32 passes through the gas supply duct 34, and is supplied to the central chamber 38A of the upper-body restraint air-bag 36. A lower end portion (a downstream side end portion in the gas supply direction) of the central chamber 38A is opened, and from the opening, the gas is supplied to the left chamber 38L and the right chamber 38R.

As shown in the plan sectional view of FIG. 9B, the upper-body restraint air-bag 36 after the completion of the expanding spread is not configured such that the central chamber 38A, the left chamber 38L, and the right chamber 38R partially overlap, and the thicknesses of the central chamber 38A, the left chamber 38L, and the right chamber 38R are equivalent to each other, similarly to the upper-stage chamber 38U, the central-stage chamber 38C, and the lower-stage chamber 38D in the first embodiment.

With the upper-body restraint air-bag 36 according to the second embodiment configured in this way, the shape of the upper-body restraint air-bag 36 after the completion of the expanding spread is the above roughly right triangle shape in front view, similarly to the first embodiment, and therefore it is possible to form the gap between the shoulder belt 22A and the abdominal region Pt of the occupant P. Accordingly, it is possible to ease the hard press to the abdominal region Pt of the occupant P due to the concentrated load that is applied by the shoulder belt 22A.

Further, in the interior of the upper-body restraint air-bag 36, the central chamber 38A that extends along the shoulder belt 22A and that overlaps with the shoulder belt 22A, and the left chamber 38L and right chamber 38R that receive the supply of the gas from the central chamber 38A are provided. That is, the central chamber 38A overlapping with the shoulder belt 22A performs the first expanding spread (completes the expanding spread). Accordingly, it is possible to early secure the thickness of the upper-body restraint air-bag 36 overlapping with the shoulder belt 22A, and it is possible to curb or prevent the upper-body restraint air-bag 36 from crushing due to the concentrated load by the shoulder belt 22A.

Modification of Second Embodiment

Figure 10A:
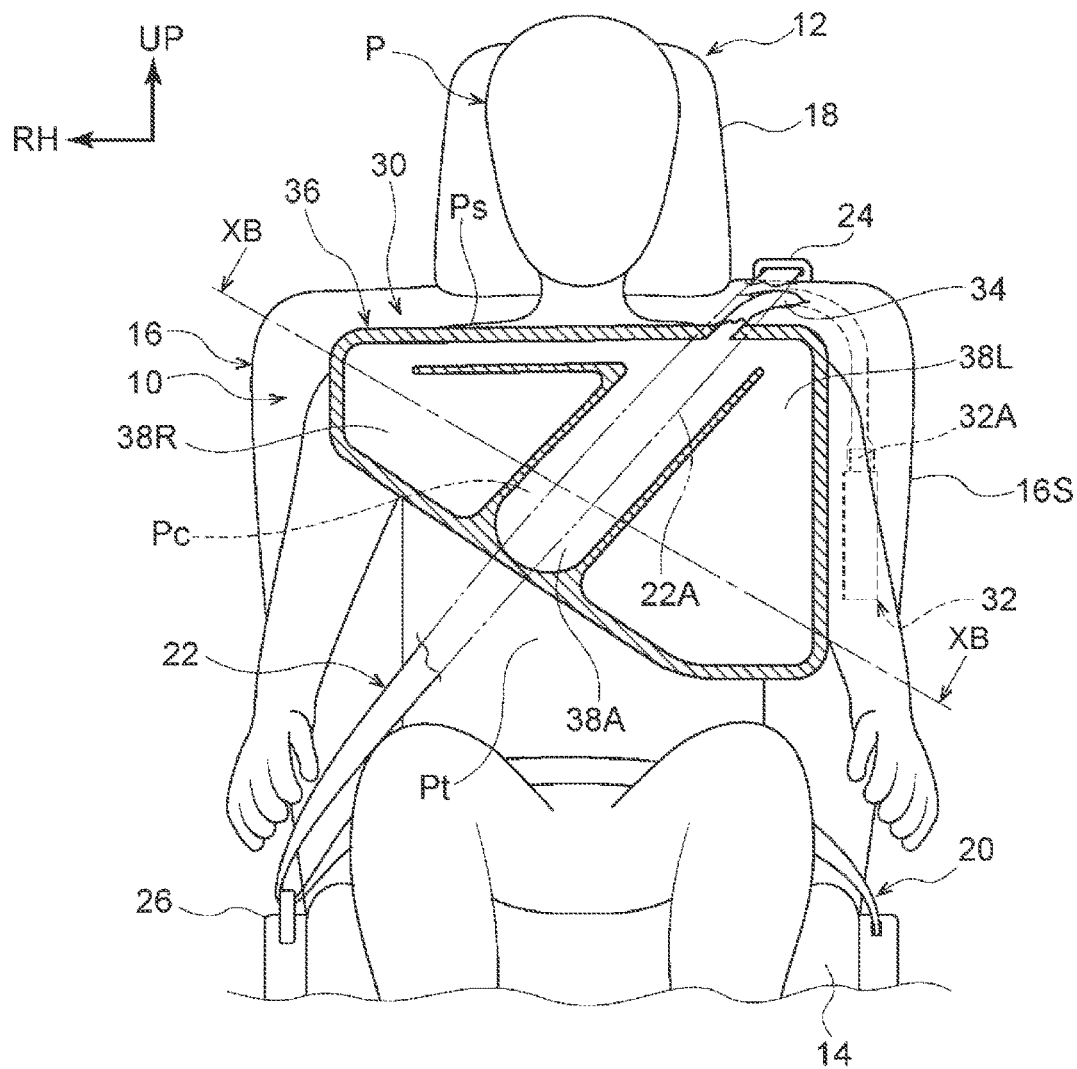
FIG. 10A is a schematic front view showing, as a section, a state where an upper-body restraint air-bag of a vehicle occupant restraint device according to modification of the second embodiment has performed the expanding spread.

Further, the upper-body restraint air-bag 36 may be configured as shown in FIG. 10A. That is, it is allowable to adopt a configuration in which the upper end portion (an upstream side end portion in the gas supply direction) of the central chamber 38A is opened and the lower end portion (a downstream side end portion in the gas supply direction) of the central chamber 38A is closed. In this case, the gas ejected from the inflator 32 passes through the gas supply duct 34, and is supplied not only to the central chamber 38A of the upper-body restraint air-bag 36 but also to the left chamber 38L and the right chamber 38R.

In the case of the upper-body restraint air-bag 36 according to the modification of the second embodiment, the check valve structure 40 in the first embodiment can be applied to the central chamber 38A. The check valve structure 40 provided in the central chamber 38A can be regarded as an example of the second check valve structure. That is, the other end portion (upper end portion) of the gas supply duct 34 may be disposed so as to face the opening portion 50, and the central chamber 38A may perform the expanding spread earlier than the left chamber 38L and the right chamber 38R. After the central chamber 38A is sealed by the check valve structure 40, the gas may be supplied to the left chamber 38L and the right chamber 38R.

Figure 10B:
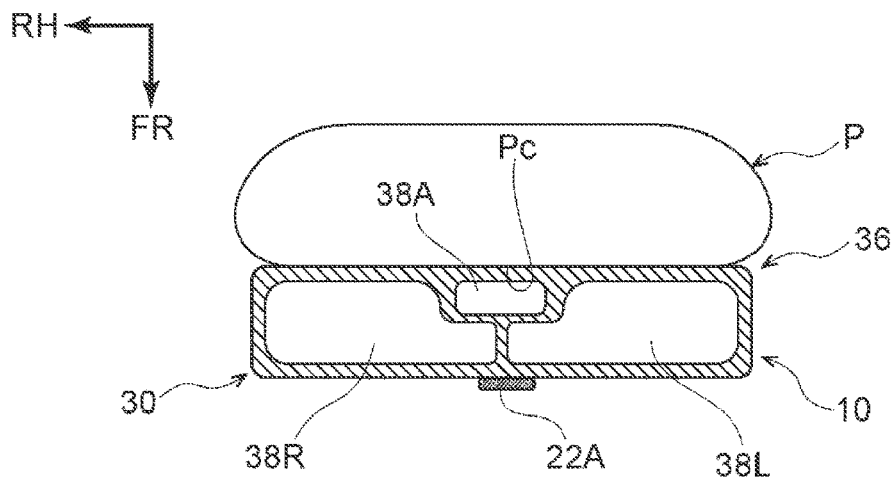
FIG. 10B is a schematic sectional view as viewed in the direction of line arrow XB-XB in FIG. 10A.

Further, as shown in the plan sectional view of FIG. 10B, the upper-body restraint air-bag 36 according to the modification of the second embodiment after the completion of the expanding spread is configured such that the left chamber 38L and the right chamber 38R partially overlap with the central chamber 38A in the thickness direction. Specifically, such a disposition that a part of the left chamber 38L on the front side and on the shoulder belt 22A side and a part of the right chamber 38R on the front side and on the shoulder belt 22A side cover the front side of the central chamber 38A from the forward side is adopted.

With the upper-body restraint air-bag 36 according to the modification of the second embodiment configured in this way, at the portion where the central chamber 38A overlaps with the left chamber 38L and the right chamber 38R in the thickness direction, the internal pressure in the thickness direction is increased. Therefore, in addition to the above function effect, even when the upper body (upper half body) of the occupant P is about to come down to the forward side due to inertial force at the time of the frontal collision of the vehicle, it is possible to curb or prevent the upper-body restraint air-bag 36 from being bent and deformed to the opposite occupant P side (forward side) at the shoulder belt 22A that is a base point (support point), using the portion where the central chamber 38A overlaps with the left chamber 38L and the right chamber 38R in the thickness direction. Consequently, it is possible to effectively restrain the occupant P.

Third Embodiment

Next, a third embodiment will be described. Sites equivalent to those in the first embodiment and the second embodiment are denoted by identical reference characters, and detailed descriptions (including common operations) thereof are omitted when appropriate.

Figure 11:
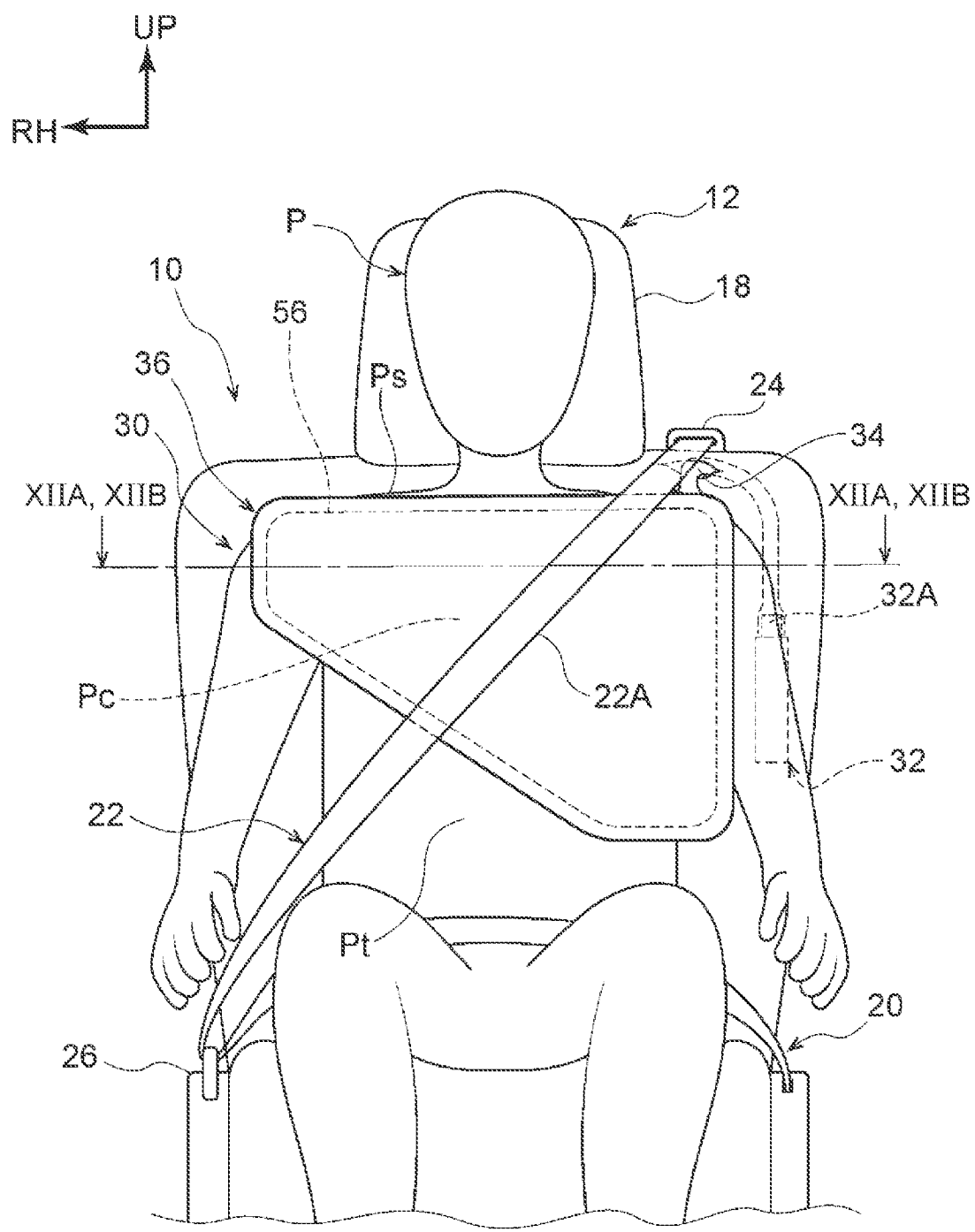
FIG. 11 is a schematic front view showing a state where an upper-body restraint air-bag of a vehicle occupant restraint device according to a third embodiment has performed the expanding spread, together with a tether provided on an occupant side.
Figure 12A:
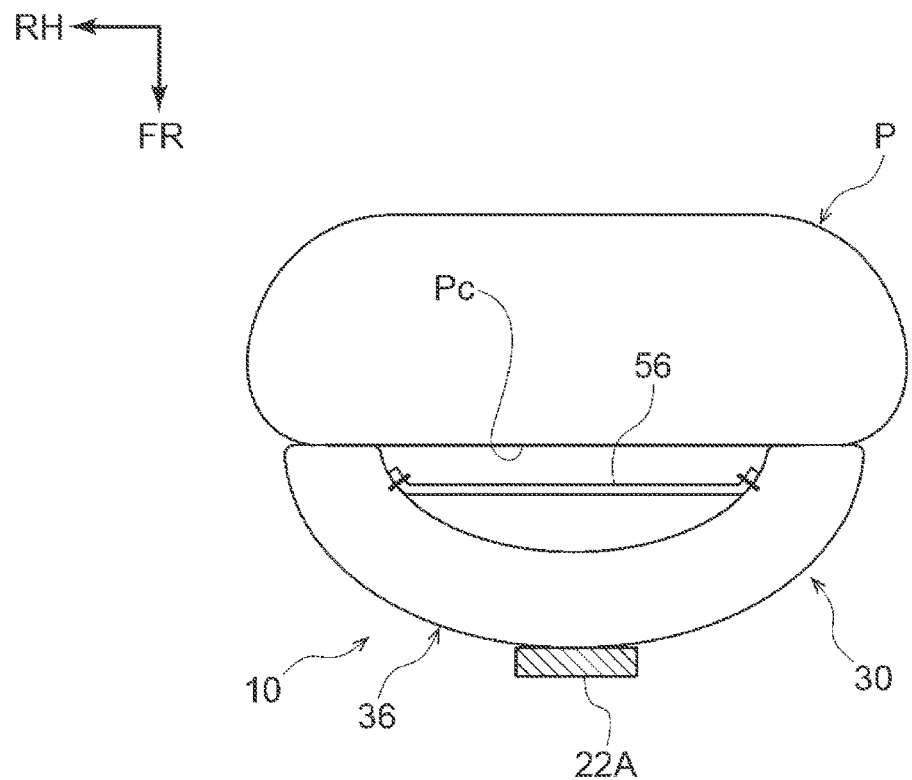
FIG. 12A is a schematic sectional view as viewed in the direction of line arrow XIIA-XIIA in FIG. 11.
Figure 12B:
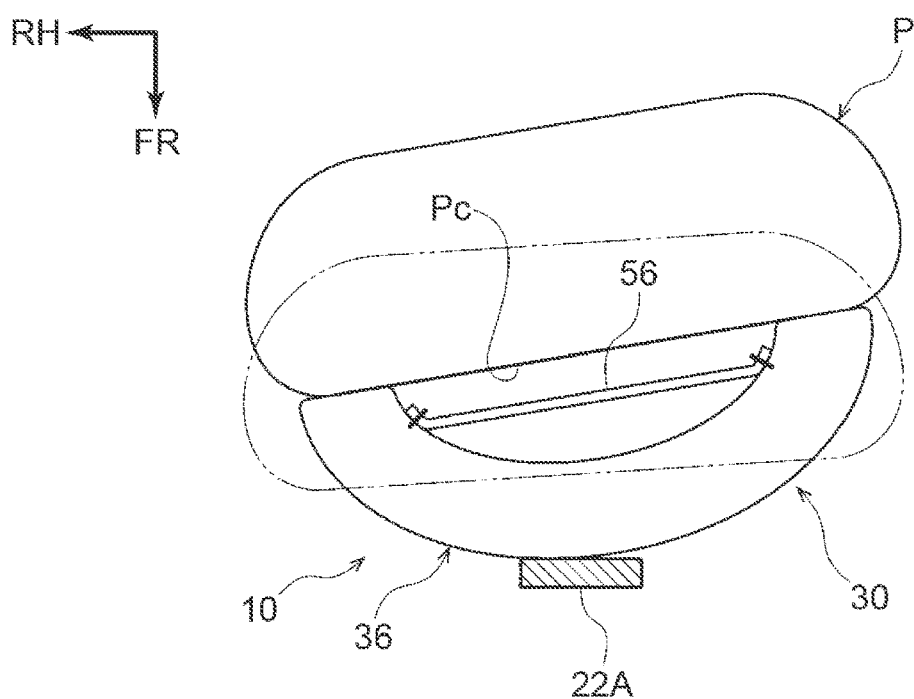
FIG. 12B is a schematic sectional view showing a case where an occupant is moved by inertial force, as viewed in the direction of line arrow XIIB-XIIB in FIG. 11.

As shown in FIG. 11, FIG. 12A, and FIG. 12B, the third embodiment is different from the first embodiment and the second embodiment, only in that both left and right end portions (both end portions in the seat width direction) of the upper-body restraint air-bag 36 are coupled by a tether 56 disposed on the occupant P side (base cloth 36B side) and thereby the upper-body restraint air-bag 36 has a curved shape (arched shape) that is convex to the forward side in plan view.

The tether 56 is formed in a roughly right triangle shape that is the same shape as the shape of the upper-body restraint air-bag 36, in front view. The length in the seat width direction is shorter by a predetermined length than the length of the upper-body restraint air-bag 36 in the seat width direction. Moreover, a left end portion (one end portion in the seat width direction) and a right end portion (the other end portion in the seat width direction) of the tether 56 are sewed and attached to both left and right end portions of the base cloth 36B constituting the rear wall of the upper-body restraint air-bag 36, respectively.

Therefore, as shown in FIG. 12A, after the expanding spread of the upper-body restraint air-bag 36, the upper-body restraint air-bag 36 has a curved shape that is convex to the forward side in plan view. Accordingly, even when the upper-body restraint air-bag 36 is about to be bent and deformed to the opposite occupant P side (forward side) at the shoulder belt 22A that is a base point (support point), it is possible to more effectively curb or prevent the bending and deforming.

Further, with the upper-body restraint air-bag 36 according to the third embodiment configured in this way, the contact pressure to the occupant P at both end portions of the upper-body restraint air-bag in the seat width direction rises, and therefore it is possible to reduce the movement amount of the upper body (upper half body) of the occupant P to the forward side from the shoulder belt 22A that is a base point (support point), specifically, the movement amount by which the right side (opposite shoulder belt 22A side) of the upper body (upper half body) of the occupant P protrudes to the forward side as shown in FIG. 12B (it is possible to hold the upper body (upper half body) of the occupant P at a position shown by an imaginary line).

A member that makes the curved shape (arched shape) that is convex to the forward side in plan view in the state after the completion of the expanding spread of the upper-body restraint air-bag 36 when the upper-body restraint air-bag 36 performs the expanding spread is not limited to the above tether 56. For example, it is allowable to adopt a strap (not illustrated) having a rectangular shape in which the longitudinal direction is the seat width direction. That is, it is allowable to adopt a strap formed such that the length of the strap in the seat width direction is shorter by a predetermined length than the length of the upper-body restraint air-bag 36 in the seat width direction.

Fourth Embodiment

Next, a fourth embodiment will be described. Sites equivalent to those in the first to third embodiments are denoted by identical reference characters, and detailed descriptions (including common operations) thereof are omitted when appropriate.

Figure 13:
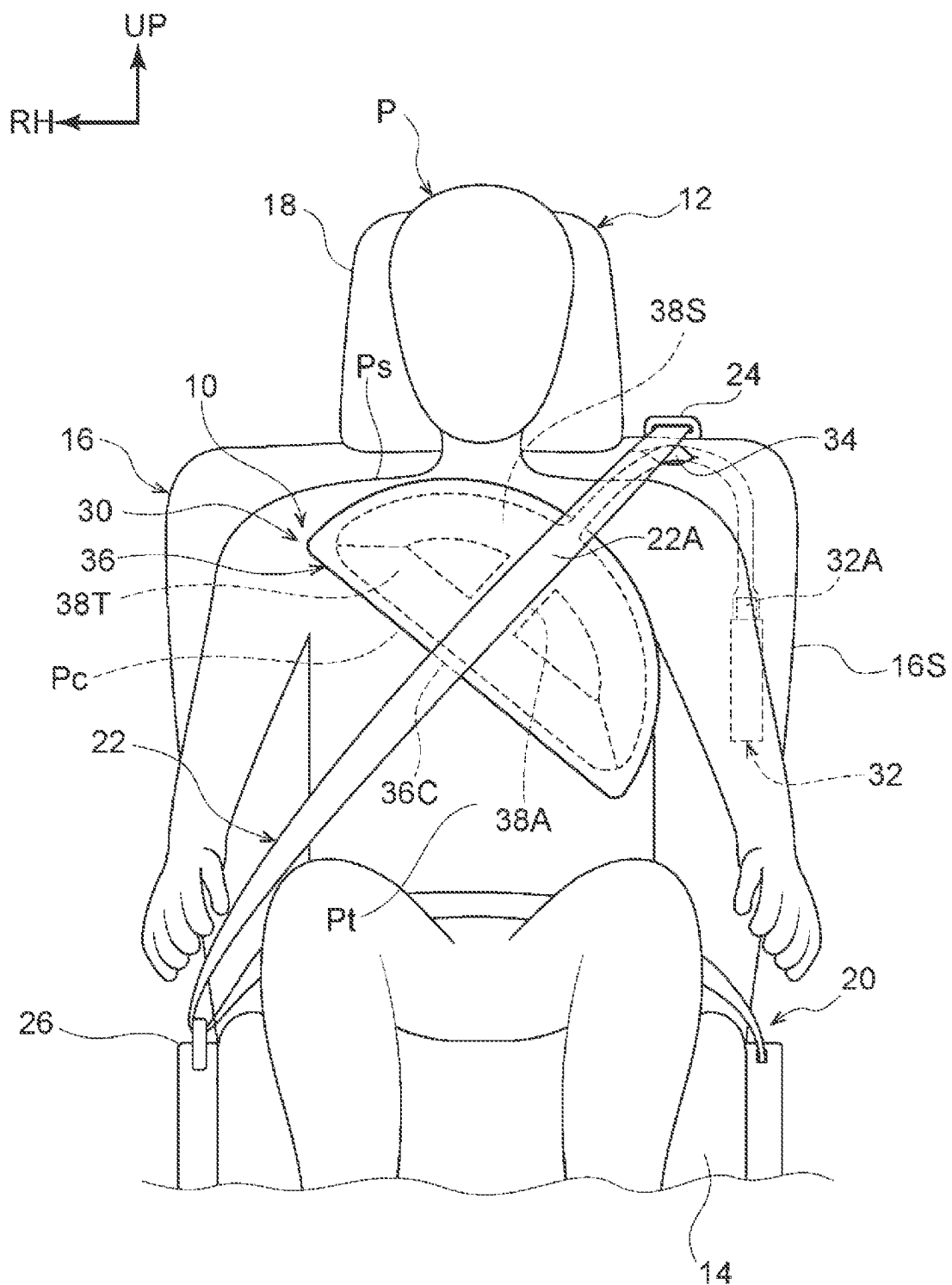
FIG. 13 is a schematic front view showing a state where an upper-body restraint air-bag of a vehicle occupant restraint device according to a fourth embodiment has performed the expanding spread.

As shown in FIG. 13, the fourth embodiment is different from the second embodiment, only in that the shape of the upper-body restraint air-bag 36 after the completion of the expanding spread is a semicircular shape in which half on the lower right side (opposite shoulder belt 22A side) does not exist in front view and the gas supplied from the other end portion (upper end portion) of the gas supply duct 34 after passing through the gas supply duct 34 from the inflator 32 is supplied in the left and right circumferential directions and in the direction toward the central portion 36C of the circle, and further is supplied from the central portion 36C to radially outer sides.

That is, the upper-body restraint air-bag 36 according to the fourth embodiment is configured to include a central chamber 38A that extends along the shoulder belt 22A and that overlaps with the shoulder belt 22A, a semi-arc chamber 38S that extends in left and right circumferential directions from an upper end portion (an upstream side end portion in the gas supply direction) of the central chamber 38A, and a linear chamber 38T that extends to radially outer sides from a lower end portion (a downstream side end portion in the gas supply direction) of the central chamber 38A that is the central portion 36C of the circle of the upper-body restraint air-bag 36.

With the upper-body restraint air-bag 36 according to the fourth embodiment configured in this way, it is possible to form the gap between the shoulder belt 22A and the abdominal region Pt of the occupant P, similarly to the first embodiment and the second embodiment. Accordingly, it is possible to ease the hard press to the abdominal region Pt of the occupant P due to the concentrated load that is applied by the shoulder belt 22A.

Further, in the interior of the upper-body restraint air-bag 36, the central chamber 38A that extends along the shoulder belt 22A and that overlaps with the shoulder belt 22A, the semi-arc chamber 38S in which the gas is supplied in the circumferential directions from the upper end portion of the central chamber 38A, and the linear chamber 38T in which the gas is supplied to the radially outer sides from the central portion 36C of the circle that is the lower end portion of the central chamber 38A are provided.

That is, the central chamber 38A overlapping with the shoulder belt 22A performs the first expanding spread (completes the expanding spread). Accordingly, it is possible to early secure the thickness of the upper-body restraint air-bag 36 overlapping with the shoulder belt 22A, and it is possible to curb or prevent the upper-body restraint air-bag 36 from crushing due to the concentrated load by the shoulder belt 22A.

Fifth Embodiment

Finally, a fifth embodiment will be described. Sites equivalent to those in the first to fourth embodiments are denoted by identical reference characters, and detailed descriptions (including common operations) thereof are omitted when appropriate.

Figure 14:
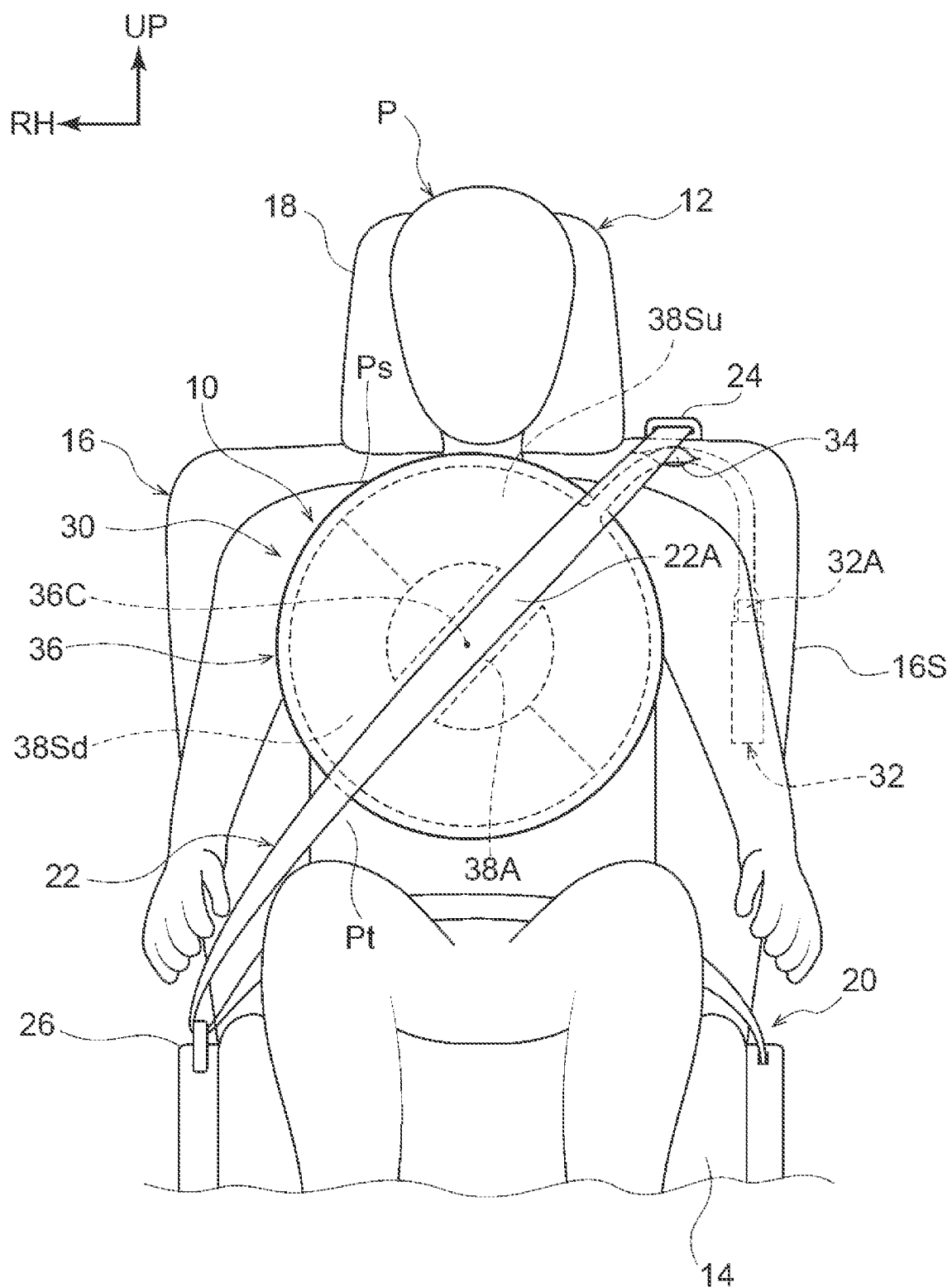
FIG. 14 is a schematic front view showing a state where an upper-body restraint air-bag of a vehicle occupant restraint device according to a fifth embodiment has performed the expanding spread.

As shown in FIG. 14, in the fifth embodiment, the shape of the upper-body restraint air-bag 36 after the completion of the expanding spread is a circular shape in front view, and the gas supplied from the other end portion (upper end portion) of the gas supply duct 34 after passing through the gas supply duct 34 from the inflator 32 is supplies in the left and right circumferential directions and in the direction toward the central portion 36C of the circle, and further is supplied in the left and right circumferential directions from the opposite side across the central portion 36C.

That is, the upper-body restraint air-bag 36 according to the fifth embodiment is configured to include a central chamber 38A that extends along the shoulder belt 22A and that overlaps with the shoulder belt 22A, an upper semi-arc chamber 38Su that extends in the left and right circumferential directions from an upper end portion (an upstream side end portion in the gas supply direction) of the central chamber 38A, and a lower semi-arc chamber 38Sd that extends in the left and right circumferential directions from a lower end portion (a downstream side end portion in the gas supply direction) of the central chamber 38A that is positioned on the opposite side across the central portion 36C of the circle of the upper-body restraint air-bag 36.

With the upper-body restraint air-bag 36 according to the fifth embodiment configured in this way, it is possible to form the gap between the shoulder belt 22A and the abdominal region Pt (specifically, the right lateral region of the abdomen) of the occupant P, similarly to the first embodiment, the second embodiment, and the fourth embodiment. Accordingly, it is possible to ease the hard press to the abdominal region Pt (the right lateral region of the abdomen) of the occupant P due to the concentrated load that is applied by the shoulder belt 22A.

Further, in the interior of the upper-body restraint air-bag 36, the central chamber 38A that extends along the shoulder belt 22A and that overlaps with the shoulder belt 22A, the upper semi-arc chamber 38Su in which the gas is supplied in the circumferential directions from the upper end portion of the central chamber 38A, and the lower semi-arc chamber 38Sd in which the gas is supplied in the circumferential directions from the lower end portion of the central chamber 38A are provided.

That is, the central chamber 38A overlapping with the shoulder belt 22A performs the first expanding spread (completes the expanding spread). Accordingly, it is possible to early secure the thickness of the upper-body restraint air-bag 36 overlapping with the shoulder belt 22A, and it is possible to curb or prevent the upper-body restraint air-bag 36 from crushing due to the concentrated load by the shoulder belt 22A.

The vehicle occupant restraint devices 10 according to the embodiments have been described above, based on the drawings. The vehicle occupant restraint devices 10 according to the embodiments are not limited to the illustrated vehicle occupant restraint devices, and design alteration can be performed when appropriate, without departing from the spirit of the present disclosure. For example, it is allowable to adopt a configuration in which the other end portion (upper end portion) of the gas supply duct 34 protrudes from the shoulder belt anchorage 24.

Further, in the first embodiment, the number of chambers 38 formed in the interior of the upper-body restraint air-bag 36 may be two, for example. In this case, the check valve structure 40 is provided only in the upper-stage chamber 38U. That is, the check valve structure 40 only needs to be provided at least in the upper-stage chamber 38U. Further, the number of chambers 38 formed in the interior of the upper-body restraint air-bag 36 may be four or more.

Further, in the upper-body restraint air-bag 36, the shape in which the front-view area of the opposite shoulder belt 22A side that is the opposite side of the shoulder belt 22A side is set so as to be smaller than the front-view area of the shoulder belt 22A side is not limited to the illustrated roughly right triangle shape and semicircular shape, and for example, may be a roughly triangular shape that has no right interior angle or may be an arrow-like shape in which only the portion overlapping with the shoulder belt 22A is slightly elongated in the lower right direction, or the like.

What is claimed is:

1. A vehicle occupant restraint device comprising:
   a seatbelt configured to restrain an occupant on a vehicle seat, the occupant sitting in the vehicle seat; and
   an upper-body restraint air-bag configured to perform expanding spread between a shoulder belt of the seatbelt and a chest region of the occupant and to restrain at least the chest region of the occupant, by receiving supply of gas from an inflator, at a time of frontal collision of a vehicle, wherein
   in the upper-body restraint air-bag after completion of the expanding spread,
   an area of the upper-body restraint air-bag on an opposite shoulder belt side in front view is set so as to be smaller than an area of the upper-body restraint air-bag on a shoulder belt side in the front view, the opposite shoulder belt side being opposite to the shoulder belt side, and
   the upper-body restraint air-bag is configured such that the upper-body restraint air-bag on the shoulder belt side restrains the occupant from a shoulder region to an abdominal region and the upper-body restraint air-bag on the opposite shoulder belt side restrains the occupant from the shoulder region to the chest region.

2. The vehicle occupant restraint device according to claim 1, wherein:
   the upper-body restraint air-bag is attached to an occupant side of the shoulder belt while being folded; and a shoulder belt anchorage of the seatbelt and the inflator are provided at a seatback of the vehicle seat, and the upper-body restraint air-bag is configured to receive the supply of the gas from the inflator through a gas supply duct that passes through a vehicle downward side of the shoulder belt anchorage.

3. The vehicle occupant restraint device according to claim 1, wherein:
a shape of the upper-body restraint air-bag after the completion of the expanding spread is a triangular shape in the front view; and
the upper-body restraint air-bag includes chambers at a plurality of stages in an interior, and is configured such that the gas is sequentially supplied from a chamber at a highest stage to a chamber at a lowest stage in a middle of the expanding spread, each of the chambers extending along a seat width direction.

4. The vehicle occupant restraint device according to claim 3, further comprising a first check valve structure provided in the chamber at the highest stage, wherein:
the first check valve structure is configured to hold an internal pressure of the chamber at the highest stage; and
the first check valve structure includes a cloth member configured to have slack so as not to close a vent hole in the middle of the expanding spread and configured to eliminate the slack so as to close the vent hole at a time of the completion of the expanding spread, the vent hole being a hole through which the gas from the inflator passes.

5. The vehicle occupant restraint device according to claim 4, wherein:
a partition cloth that partitions an internal space of the chamber at the highest stage is provided in the interior of the chamber at the highest stage; and
the vent hole is provided on the partition cloth.

6. The vehicle occupant restraint device according to claim 1, wherein:
a shape of the upper-body restraint air-bag after the completion of the expanding spread is a triangular shape in the front view; and
the upper-body restraint air-bag includes a central chamber, a left chamber, and a right chamber in an interior, the central chamber extending along the shoulder belt and overlapping with the shoulder belt, each of the left chamber and the right chamber being configured to receive supply of gas from the central chamber.

7. The vehicle occupant restraint device according to claim 6, wherein the upper-body restraint air-bag after the completion of the expanding spread is configured such that the left chamber and the right chamber partially overlap with the central chamber in plan sectional view.

8. The vehicle occupant restraint device according to claim 7, further comprising a second check valve structure provided in the central chamber, wherein:
the second check valve structure is configured to hold an internal pressure of the central chamber; and
the second check valve structure includes a cloth member configured to have slack so as not to close a vent hole in a middle of the expanding spread and configured to eliminate the slack so as to close the vent hole at a time of the completion of the expanding spread, the vent hole being a hole through which the gas from the inflator passes.

9. The vehicle occupant restraint device according to claim 3, wherein both end portions of the upper-body restraint air-bag in the seat width direction are coupled by a tether that is disposed on an occupant side or a strap that is disposed on the occupant side, such that the upper-body restraint air-bag has a curved shape that is convex to a seat forward side in plan view.

10. The vehicle occupant restraint device according to claim 1, wherein:
a shape of the upper-body restraint air-bag after the completion of the expanding spread is a semicircular shape in the front view; and
the upper-body restraint air-bag includes a central chamber, a semi-arc chamber, and a linear chamber in an interior, the central chamber extending along the shoulder belt and overlapping with the shoulder belt, the semi-arc chamber being configured such that gas is supplied in a circumferential direction from an upper end portion of the central chamber, the linear chamber being configured such that gas is supplied to a radially outer side from a central portion that is a lower end portion of the central chamber.

11. A vehicle occupant restraint device comprising:
a seatbelt configured to restrain an occupant on a vehicle seat, the occupant sitting in the vehicle seat; and
an upper-body restraint air-bag configured to perform expanding spread between a shoulder belt of the seatbelt and a chest region of the occupant and to restrain at least the chest region of the occupant, by receiving supply of gas from an inflator, at a time of frontal collision of a vehicle, wherein:
a shape of the upper-body restraint air-bag after a completion of the expanding spread is a circular shape in front view; and
the upper-body restraint air-bag includes a central chamber, an upper semi-arc chamber, and a lower semi-arc chamber in an interior, the central chamber extending along the shoulder belt and overlapping with the shoulder belt, the upper semi-arc chamber being configured such that gas is supplied in a circumferential direction from an upper end portion of the central chamber, the lower semi-arc chamber being configured such that gas is supplied in the circumferential direction from a lower end portion of the central chamber.

12. The vehicle occupant restraint device according to claim 2, wherein the shoulder belt anchorage is provided at one end portion in a seat width direction of an upper end surface of the seatback.

13. The vehicle occupant restraint device according to claim 2, wherein the gas supply duct includes
an upper end portion that passes through the vehicle downward side of the shoulder belt anchorage, and
a lower end portion that is connected to the inflator so as to communicate with the inflator.

14. The vehicle occupant restraint device according to claim 3, wherein the shape, in the front view, of the upper-body restraint air-bag after the completion of the expanding spread is a right triangle shape in which the opposite shoulder belt side is eliminated to form a hypotenuse side.

15. The vehicle occupant restraint device according to claim 1, wherein
the upper-body restraint air-bag includes tethers that partition an interior of the upper-body restraint air-bag into a plurality of chambers, and
each of the tethers includes an opening portion that is a through-hole and that is formed at a portion of each of the tethers on the shoulder belt side.

16. The vehicle occupant restraint device according to claim 13, wherein the upper-body restraint air-bag includes a central chamber, a left chamber and a right chamber in an interior, the upper end portion of the gas supply duct is connected to an upper end portion of the central chamber such that gas ejected from the inflator passes through the gas supply duct and is supplied to the central chamber, and a lower end portion of the central chamber includes an opening such that the gas is supplied from the opening of the central chamber to the left chamber and the right chamber.

17. The vehicle occupant restraint device according to claim 13, wherein the upper-body restraint air-bag includes a central chamber, a left chamber and a right chamber in an interior, an upper end portion of the central chamber is opened and a lower end portion of the central chamber is closed such that the gas ejected from the inflator passes through the gas supply duct and is supplied to the central chamber, the left chamber and the right chamber.

* * * * *